(12) United States Patent
Tsuchida et al.

(10) Patent No.: US 8,510,249 B2
(45) Date of Patent: Aug. 13, 2013

(54) DETERMINING WHETHER TEXT INFORMATION CORRESPONDS TO TARGET INFORMATION

(75) Inventors: Masaaki Tsuchida, Tokyo (JP); Hironori Mizuguchi, Tokyo (JP); Toshiyuki Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 340 days.

(21) Appl. No.: 13/063,231

(22) PCT Filed: Oct. 6, 2009

(86) PCT No.: PCT/JP2009/005175
§ 371 (c)(1), (2), (4) Date: Mar. 10, 2011

(87) PCT Pub. No.: WO2010/041420
PCT Pub. Date: Apr. 15, 2010

(65) Prior Publication Data
US 2011/0167027 A1 Jul. 7, 2011

(30) Foreign Application Priority Data
Oct. 10, 2008 (JP) .................... 2008-263950

(51) Int. Cl.
*G06F 17/27* (2006.01)

(52) U.S. Cl.
CPC ................ *G06F 17/2765* (2013.01)
USPC .......................................... 706/46

(58) Field of Classification Search
None
See application file for complete search history.

(56) References Cited

U.S. PATENT DOCUMENTS

| 6,826,724 | B1 * | 11/2004 | Shimada et al. | 715/234 |
| 7,017,114 | B2 * | 3/2006 | Guo et al. | 715/247 |
| 2003/0167245 | A1 * | 9/2003 | Murata | 706/46 |
| 2004/0073548 | A1 * | 4/2004 | Lim et al. | 707/5 |
| 2006/0155662 | A1 * | 7/2006 | Murakami et al. | 706/20 |

FOREIGN PATENT DOCUMENTS

| JP | 2007241902 A | 9/2007 |
| JP | 2008084064 A | 4/2008 |
| JP | 2008084203 A | 4/2008 |
| WO | 2007108529 A | 9/2007 |

OTHER PUBLICATIONS

Amini, Massih R. et al.; "Automatic Text Summarization Based on Word-Clusters and Ranking Algorithms"; 2005; Springer-Vergal; pp. 142-156.*
International Search Report for PCT/JP2009/005175 mailed Dec. 8, 2009.

* cited by examiner

*Primary Examiner* — David R Vincent
*Assistant Examiner* — Stanley K Hill

(57) ABSTRACT

An information analysis apparatus that performs an analysis on text information to determine whether or not the text information corresponds to the target information. The information analysis apparatus includes a storage device that stores the text information; a density estimation unit that estimates, in units of analysis each composed of a plurality of sentences of text information, a density indicating the degree to which the target information is included in the unit of analysis; and a determination unit that obtains an evaluation value indicating the degree to which each sentence included in each unit of analysis corresponds to the target information from the estimated density of the unit of analysis, and determines whether or not the sentence corresponds to the target information based on the evaluation value.

60 Claims, 18 Drawing Sheets

Fig. 2

| Article ID | Sentence ID | Sentence |
|---|---|---|
| 1 | 1 | Tennis player A has started with a straight-sets win on Day X of the U.S. Open Tennis. |
| 1 | 2 | "I felt no pressure at all". |
| 1 | 3 | She won the Australian Open and French Open titles. |
| 1 | 4 | She also reached the semi-finals at Wimbledon. |
| 1 | 5 | Tennis player A has fully recovered from her long slump. |
| 1 | 6 | If she has any unfinished business, it's to complete the Grand Slam by winning Wimbledon and the U.S. Open. |
| 1 | 7 | The semi-finals were her best result at the U.S. Open since her first appearance in year Y. |
| 1 | 8 | Some concerns about her resolve this year in which she entered as one of the top favorites for victory. |
| 1 | 9 | She was quoted as saying, "I'm trying not to get distracted". |
| 1 | 10 | Up until last year's championships, it was always the many scandals surrounding her that were brought up whenever she held a press conference. |
| 1 | 11 | However, tennis player A has got her old confidence back, and has set her sights on victory this year. |
| 2 | | . . . |

Fig. 5

| Unit-of-analysis ID | Article ID | Sentence ID | Sentence |
|---|---|---|---|
| 1 | 1 | 1 | Tennis player A has started with a straight-sets win on Day X of the U.S. Open Tennis. |
| | 1 | 1 | Tennis player A has started with a straight-sets win on Day X of the U.S. Open Tennis. |
| | 1 | 1 | Tennis player A has started with a straight-sets win on Day X of the U.S. Open Tennis. |
| 2 | 1 | 1 | Tennis player A has started with a straight-sets win on Day X of the U.S. Open Tennis. |
| | 1 | 1 | Tennis player A has started with a straight-sets win on Day X of the U.S. Open Tennis. |
| | 1 | 2 | "I felt no pressure at all". |
| 3 | 1 | 1 | Tennis player A has started with a straight-sets win on Day X of the U.S. Open Tennis. |
| | 1 | 2 | "I felt no pressure at all". |
| | 1 | 3 | She won the Australian Open and French Open titles. |
| 4 | 1 | 2 | "I felt no pressure at all". |
| | 1 | 3 | She won the Australian Open and French Open titles. |
| | 1 | 4 | She also reached the semi-finals at Wimbledon. |
| 5 | 1 | 3 | She won the Australian Open and French Open titles. |
| | 1 | 4 | She also reached the semi-finals at Wimbledon. |
| | 1 | 5 | Tennis player A has fully recovered from her long slump. |
| 6 | 1 | 4 | She also reached the semi-finals at Wimbledon. |
| | 1 | 5 | Tennis player A has fully recovered from her long slump. |
| | 1 | 6 | If she has any unfinished business, it's to |

Fig. 6

| Word |
|---|
| Tennis |
| [Tennis player A] |
| U.S. Open |
| Australian Open |
| French Open |

Fig. 7

| Article ID | Sentence ID | Y/N | Sentence | Word appearance |
|---|---|---|---|---|
| 1 | 1 | Y | Tennis player A has started with a straight-sets win on Day X of the U.S. Open Tennis. | 1 |
| 1 | 2 | N | "I felt no pressure at all". | 0 |
| 1 | 3 | Y | She won the Australian Open and French Open titles. | 1 |
| 1 | 4 | Y | She also reached the semi-finals at Wimbledon. | 0 |
| 1 | 5 | Y | Tennis player A has fully recovered from her long slump. | 1 |
| 1 | 6 | Y | If she has any unfinished business, it's to complete the Grand Slam by winning Wimbledon and the U.S. Open. | 0 |
| 1 | 7 | Y | The semi-finals were her best result at the U.S. Open since her first appearance in year Y. | 1 |
| 1 | 8 | N | Some concerns about her resolve this year in which she entered as one of the top favorites for victory. | 0 |
| 1 | 9 | N | She was quoted as saying, "I'm trying not to get distracted". | 0 |
| 1 | 10 | Y | Up until last year's championships, it was always the many scandals surrounding her that were brought up whenever she held a press conference. | 0 |
| 1 | 11 | Y | However, tennis player A has got her old confidence back, and has set her sights on | 1 |

Fig. 8

| 1 | Tennis player A has started with a straight-sets win on Day X of the U.S. Open Tennis. | |
|---|---|---|
| 1 | Tennis player A has started with a straight-sets win on Day X of the U.S. Open Tennis. | 3 |
| 1 | Tennis player A has started with a straight-sets win on Day X of the U.S. Open Tennis. | |

— Unit of analysis 1

| 1 | Tennis player A has started with a straight-sets win on Day X of the U.S. Open Tennis. | |
|---|---|---|
| 1 | Tennis player A has started with a straight-sets win on Day X of the U.S. Open Tennis. | 2 |
| 2 | "I felt no pressure at all". | |

— Unit of analysis 2

| 1 | Tennis player A has started with a straight-sets win on Day X of the U.S. Open Tennis. | |
|---|---|---|
| 2 | "I felt no pressure at all". | 2 |
| 3 | She won the Australian Open and French Open titles. | |

— Unit of analysis 3

| 2 | "I felt no pressure at all". | |
|---|---|---|
| 3 | She won the Australian Open and French Open titles. | 1 |
| 4 | She also reached the semi-finals at Wimbledon. | |

— Unit of analysis 4

| 3 | She won the Australian Open and French Open titles. | |
|---|---|---|
| 4 | She also reached the semi-finals at Wimbledon. | 2 |
| 5 | Tennis player A has fully recovered from her long slump. | |

— Unit of analysis 5

. . .

| 9 | She was quoted as saying, "I'm trying not to get distracted". | |
|---|---|---|
| 10 | Up until last year's championships, it was always the many scandals surrounding her that were brought up whenever she held a press conference. | 1 |
| 11 | However, tennis player A has got her old confidence back, and has set her sights on victory this year. | |

— Unit of analysis 11

| 10 | Up until last year's championships, it was always the many scandals surrounding her that were brought up whenever she held a press conference. | |
|---|---|---|
| 11 | However, tennis player A has got her old confidence back, and has set her sights on victory this year. | 2 |
| 11 | However, tennis player A has got her old confidence back, and has set her sights on victory this year. | |

— Unit of analysis 12

| 11 | However, tennis player A has got her old confidence back, and has set her sights on victory this year. | |
|---|---|---|
| 11 | However, tennis player A has got her old confidence back, and has set her sights on victory this year. | 3 |
| 11 | However, tennis player A has got her old confidence back, and has set her sights on victory this year. | |

— Unit of analysis 13

Fig. 9

| Article ID | Sentence ID | Y/N | Sentence | Evaluation value |
|---|---|---|---|---|
| 1 | 1 | Y | Tennis player A has started with a straight-sets win on Day X of the U.S. Open Tennis. | 7 |
| 1 | 2 | N | "I felt no pressure at all". | 5 |
| 1 | 3 | Y | She won the Australian Open and French Open titles. | 5 |
| 1 | 4 | Y | She also reached the semi-finals at Wimbledon. | 4 |
| 1 | 5 | Y | Tennis player A has fully recovered from her long slump. | 5 |
| 1 | 6 | Y | If she has any unfinished business, it's to complete the Grand Slam by winning Wimbledon and the U.S. Open. | 4 |
| 1 | 7 | Y | The semi-finals were her best result at the U.S. Open since her first appearance in year Y. | 4 |
| 1 | 8 | N | Some concerns about her resolve this year in which she entered as one of the top favorites for victory. | 2 |
| 1 | 9 | N | She was quoted as saying, "I'm trying not to get distracted". | 2 |
| 1 | 10 | Y | Up until last year's championships, it was always the many scandals surrounding her that were brought up whenever she held a press conference. | 3 |
| 1 | 11 | Y | However, tennis player A has got her old confidence back, and has set her sights on victory this year. | 5 |

Fig. 10

| Article ID | Sentence ID | Y/N | Sentence | Determination result | Determination based on word appearance |
|---|---|---|---|---|---|
| 1 | 1 | Y | Tennis player A has started with a straight-sets win on Day X of the U.S. Open Tennis. | Y | Y |
| 1 | 2 | N | "I felt no pressure at all". | Y | N |
| 1 | 3 | Y | She won the Australian Open and French Open titles. | Y | Y |
| 1 | 4 | Y | She also reached the semi-finals at Wimbledon. | Y | N |
| 1 | 5 | Y | Tennis player A has fully recovered from her long slump. | Y | Y |
| 1 | 6 | Y | If she has any unfinished business, it's to complete the Grand Slam by winning Wimbledon and the U.S. Open. | Y | N |
| 1 | 7 | Y | The semi-finals were her best result at the U.S. Open since her first appearance in year Y. | Y | Y |
| 1 | 8 | N | Some concerns about her resolve this year in which she entered as one of the top favorites for victory. | N | N |
| 1 | 9 | N | She was quoted as saying, "I'm trying not to get distracted". | N | N |
| 1 | 10 | Y | Up until last year's | Y | N |

Fig. 11

| Article ID | Sentence ID | Sentence | Evaluation value |
|---|---|---|---|
| 1 | 1 | Tennis player A has started with a straight-sets win on Day X of the U.S. Open Tennis. | 7 |
| 1 | 2 | "I felt no pressure at all". | 5 |
| 1 | 3 | She won the Australian Open and French Open titles. | 5 |
| 1 | 4 | She also reached the semi-finals at Wimbledon. | 4 |
| 1 | 5 | Tennis player A has fully recovered from her long slump. | 5 |
| 1 | 6 | If she has any unfinished business, it's to complete the Grand Slam by winning Wimbledon and the U.S. Open. | 4 |
| 1 | 7 | The semi-finals were her best result at the U.S. Open since her first appearance in year Y. | 4 |
| 1 | 10 | Up until last year's championships, it was always the many scandals surrounding her that were brought up whenever she held a press conference. | 3 |
| 1 | 11 | However, tennis player A has got her old confidence back, and has set her sights on victory this year. | 5 |
| 2 | ... | ..... | ... |

Fig. 13

Training text information

| Article ID | Sentence ID | Target information | Sentence |
|---|---|---|---|
| 1 | 1 | Y | Tennis player A has started with a straight-sets win on Day X of the U.S. Open Tennis. |
| 1 | 2 | N | "I felt no pressure at all". |
| 1 | 3 | Y | She won the Australian Open and French Open titles. |
| 1 | 4 | Y | She also reached the semi-finals at Wimbledon. |
| 1 | 5 | Y | Tennis player A has fully recovered from her long slump. |
| 1 | 6 | Y | If she has any unfinished business, it's to complete the Grand Slam by winning Wimbledon and the U.S. Open. |
| 1 | 7 | Y | The semi-finals were her best result at the U.S. Open since her first appearance in year Y. |
| 1 | 8 | N | Some concerns about her resolve this year in which she entered as one of the top favorites for victory. |
| 1 | 9 | N | She was quoted as saying, "I'm trying not to get distracted". |
| 1 | 10 | Y | Up until last year's championships, it was always the many scandals surrounding her that were brought up whenever she held a press conference. |
| 1 | 11 | Y | However, tennis player A has got her old confidence back, and has set her sights on victory this year. |
| 2 | ... | ... | ..... |

Fig. 16

Training text information

| Sentence ID | Correctness | Sentence |
|---|---|---|
| 1 | Y | Tennis player A has started with a straight-sets win on Day X of the U.S. Open Tennis. |
| 2 | N | "I felt no pressure at all". |
| 3 | Y | She won the Australian Open and French Open titles. |
| 4 | Y | She also reached the semi-finals at Wimbledon. |
| 5 | Y | Tennis player A has fully recovered from her long slump. |
| 6 | Y | If she has any unfinished business, it's to complete the Grand Slam by winning Wimbledon and the U.S. Open. |
| 7 | Y | The semi-finals were her best result at the U.S. Open since her first appearance in year Y. |
| 8 | N | Some concerns about her resolve this year in which she entered as one of the top favorites for victory. |
| 9 | N | She was quoted as saying, "I'm trying not to get distracted". |
| 10 | Y | Up until last year's championships, it was always the many scandals surrounding her that were brought up whenever she held a press conference. |
| 11 | Y | However, tennis player A has got her old confidence back, and has set her sights on victory this year. |
| ... | ... | ... |

| Sentence ID | Estimated density |
|---|---|
| 1 | |
| 1 | 3.2 |
| 1 | |

⎫ Unit of training 1

| 1 | |
|---|---|
| 1 | 2.2 |
| 2 | |

⎫ Unit of training 1

| 1 | |
|---|---|
| 2 | 1.8 |
| 3 | |

⎫ Unit of training 1

| 2 | |
|---|---|
| 3 | 2.2 |
| 4 | |

⎫ Unit of training 1

Fig. 17

| Sentence ID | Target information? | Feature vector |
|---|---|---|
| 1 | Y | Estimated density 1=3.2, Estimated density 2=2.2<br>Estimated density 3=1.8<br>Average of estimated densities=2.4<br>Dispersion of estimated densities=0.35<br>Tennis=1, U.S. Open=1, Open Tennis=1<br>Tennis player A=1 |
| 2 | N | Estimated density 1=2.2, Estimated density 2=1.8<br>Estimated density 3=2.2<br>Average of estimated densities=2.1<br>Dispersion of estimated densities=0.03<br>Pressure=1 |
| . | . | |
| . | . | |
| . | . | |

DETERMINING WHETHER TEXT INFORMATION CORRESPONDS TO TARGET INFORMATION

TECHNICAL FIELD

The present invention relates to an information analysis apparatus, an information analysis method, and a computer-readable recording medium.

BACKGROUND ART

A situation has arisen in recent years where large volumes of information are converted to text. For use of such large volumes of text information, it is effective to extract or retrieve information in accordance with the intended use. For example, if the intended use is in decision-making when purchasing goods or in marketing support, it is desirable to extract or retrieve comments and suggestions regarding goods and services from large volumes of text information.

In order to extract or retrieve text information in accordance with the intended use of the information, it is important to determine sentences that contain target information. This is because extracting information or creating an index for retrieval from sentences that do not contain target information results in noise. A method for classifying text information depending on whether or not target information is included is conceivable as a conventional method for determining sentences that contain the target information. One specific example is a method for classifying arbitrary text data such as a classification method described in Patent Literature (PLT) 1.

The classification method disclosed in PLT 1 is a method for extracting a partial character string having an arbitrary fixed length from text information, further generating a feature vector from a feature quantity of the partial character string, and determining whether or not the text information is classified under a target category, using the feature vector. The classification method disclosed in PLT 1 is a method for classifying, in units of sentences, whether or not text information is target information. The term "sentence" as used herein refers to text generated by separating a character string in text information by a fixed length or by a sentence-end symbol.

Another conceivable method is a method for classifying, not in units of sentences, but in units of topics (hereinafter referred to as "topic units") composed of a plurality of sentences about the same topic, whether or not text information is target information. The term "topic unit" as used herein refers to text that contains a plurality of sentences and is generated by separating text at a position where the topic changes.

One example of such a method for classification in topic units is a classification method disclosed in PLT 2. The classification method disclosed in PLT 2 is a method for creating a topic vector that represents the importance of content words in each sentence so as to obtain the degree of similarity in topic vectors between two adjacent sentences, and detecting a boundary position between topics based on a change in the degree of similarity. Then, classification is made based on the detected boundary positions.

CITATION LIST

Patent Literature

PTL 1: JP 2008-84064A
PTL 2: JP 2007-241902A

DISCLOSURE OF INVENTION

Problem to be Solved by the Invention

However, the classification method disclosed in PLT 1, in which classification is made in units of sentences, has the problem that classification accuracy is reduced because no consideration is given to the tendency of appearance of target information. The reason is as follows.

The term "tendency of appearance of target information" as used herein refers to the likelihood of pieces of target information being contained in clusters. If pieces of target information are likely to be contained in clusters, it is conceivable that when a single piece of target information is found, neighboring sentences will also contain the target information. In this case, although it is conceivable that using target information contained in such neighboring sentences can increase the accuracy of classification more than in the case of classifying individual sentences, PLT 1 does not make effective use of target information contained in neighboring sentences, and therefore it is difficult to improve the classification accuracy.

On the other hand, with the method disclosed in PLT 2, text sets targeted for classification can be divided into units constituted by sets of text regarding the same topic, that is, into units (topic units) each composed of a plurality of sentences in which there is a continuity of topic. Accordingly, it is possible, by combining the method disclosed in PLT 2 and the method disclosed in PLT 1, to determine whether or not text information is target information, while taking into consideration the continuity of topic. Accordingly, it is conceivable that the use of the method disclosed in PLT 2 can resolve the problem with the method of PLT 1.

However, the method disclosed in PLT 2, in which text is divided into topic units, has the problem that determination in units of sentences is, in principle, difficult because topic units do not always match ranges that contain target information. The reason is as follows.

Division into topic units is made from a point of view different from that used to determine whether or not text is target information. In other words, in the case of dividing text into topic units, the range of the same topic is specified by, for example, similarity of words used in adjacent portions of text, and therefore the range is not always specified by taking into consideration whether or not user-specified target information is contained. Accordingly, even if a certain topic unit is classified under a category that contains target information, it does not mean that all sentences contained in that topic unit are actually target information. For example, in the case where target information refers to "sentences that contain comments", a topic unit regarding certain news may include a sentence that does not contain comments. In this way, a topic unit may also include a sentence that is not target information, although it is not determined whether or not the sentence is target information.

An object of the present invention is to provide an information analysis apparatus, an information analysis method, and a computer-readable recording medium that solve the above problems and enable target information to be determined in units of single sentences, rather than in units of plural sentences, while taking into consideration the tendency of appearance of the target information.

Means for Solving Problem

In order to achieve the above-described object, an information analysis apparatus according to the present invention is an information analysis apparatus for performing an analysis on text information to determine whether or not the text information corresponds to target information. The apparatus includes a density estimation unit that estimates, in units of analysis each composed of a plurality of sentences of the text information, a density indicating a degree to which each unit of analysis contains the target information, and a determination unit that obtains an evaluation value indicating a degree to which each sentence included in each unit of analysis corresponds to the target information from the estimated density of the unit of analysis, and determines whether or not the sentence is the target information based on the evaluation value.

Also, in order to achieve the above-described object, an information analysis method according to the present invention is an information analysis method for performing an analysis on text information to determine whether or not the text information corresponds to target information. The method includes the steps of (a) estimating, in units of analysis each composed of a plurality of sentences of the text information, a density indicating a degree to which the unit of analysis contains the target information, and (b) obtaining an evaluation value indicating a degree to which each sentence included in each unit of analysis corresponds to the target information from the estimated density of the unit of analysis, and determining whether or not the sentence is the target information based on the evaluation value.

Moreover, in order to achieve the above-described object, a computer-readable recording medium according to the present invention is a computer-readable recording medium that records a program for causing a computer to perform an analysis on text information to determine whether or not the text information corresponds to target information, the program including instructions to cause the computer to execute the steps of (a) estimating, in units of analysis each composed of a plurality of sentences of the text information, a density indicating a degree to which the unit of analysis contains the target information, and (b) obtaining an evaluation value indicating a degree to which each sentence included in each unit of analysis corresponds to the target information from the estimated density of the unit of analysis, and determining whether or not the sentence is the target information based on the evaluation value.

Effects of the Invention

As described above, the information analysis apparatus, the information analysis method, and the computer-readable recording medium according to the present invention enable target information to be determined in units of single sentences, rather than in units of plural sentences, while taking into consideration the tendency of appearance of the target information.

BRIEF DESCRIPTION OF DRAWINGS

FIG. 2 is a diagram showing an example of text information targeted for analysis.

FIG. 5 is a diagram showing an example of text information stored in an input text storage unit shown in FIG. 1 in a state where units of analysis have been set in advance.

FIG. 6 is a diagram showing an example of a word list used by a density estimation model stored in a density estimation model storage unit shown in FIG. 1.

FIG. 7 is a diagram illustrating how densities are estimated.

FIG. 8 is a diagram showing an example of units of analysis whose densities have been estimated.

FIG. 9 is a diagram showing an example of evaluation values calculated for each sentence.

FIG. 10 is a diagram showing an example of determination results indicating whether or not each sentence is a target information descriptive sentence.

FIG. 11 is a diagram showing an example of a display result.

FIG. 13 is a diagram showing an example of training text information.

FIG. 16 is a diagram showing an example of data output from a density estimation model learning unit.

FIG. 17 is a diagram showing an example of data generated by a determination model learning unit 92.

DESCRIPTION OF THE INVENTION

Exemplary Embodiment 1

Figure 1:
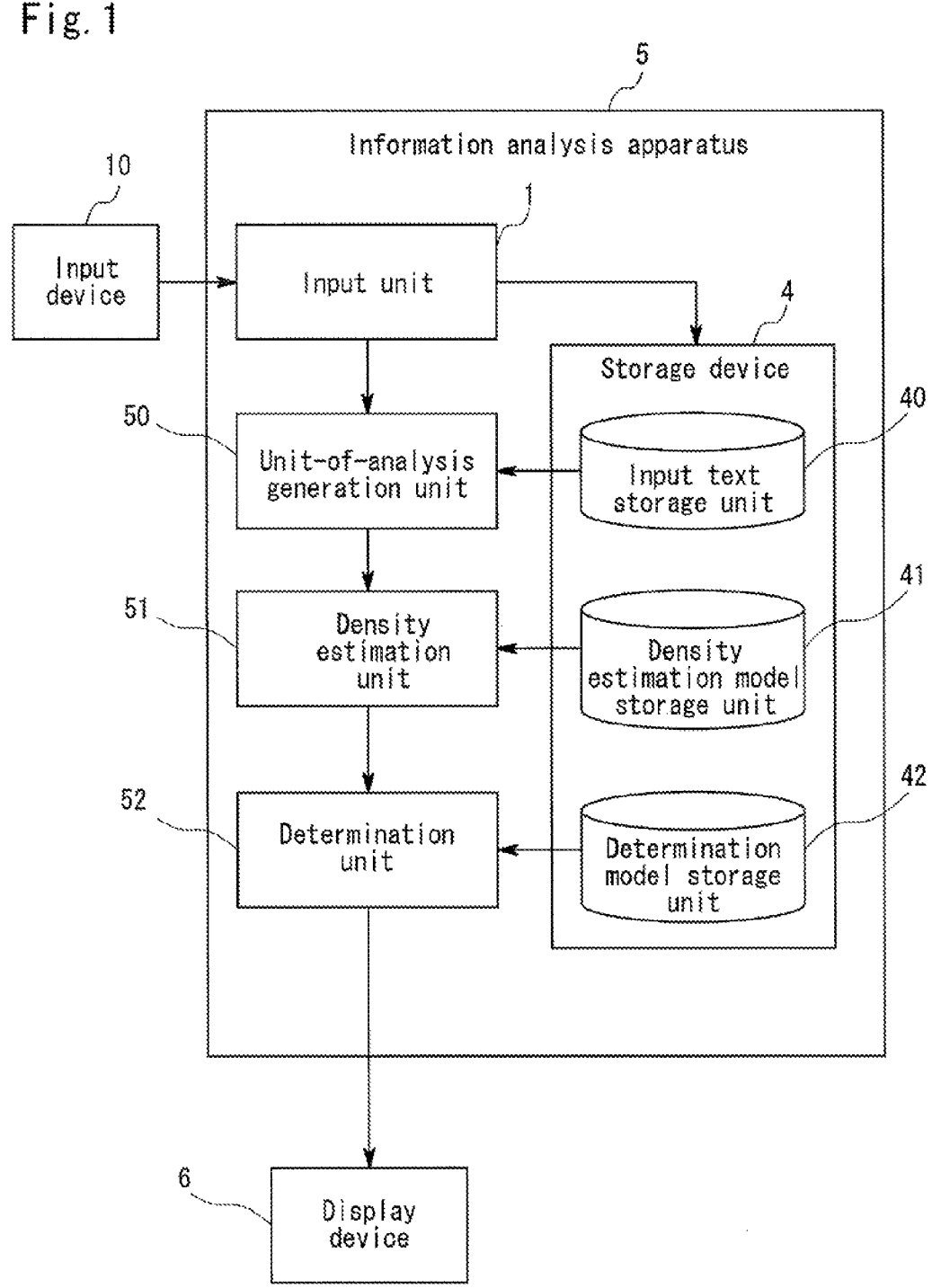
FIG. 1 is a block diagram showing a schematic configuration of an information analysis apparatus according to Exemplary embodiment 1 of the present invention.
Figure 3:
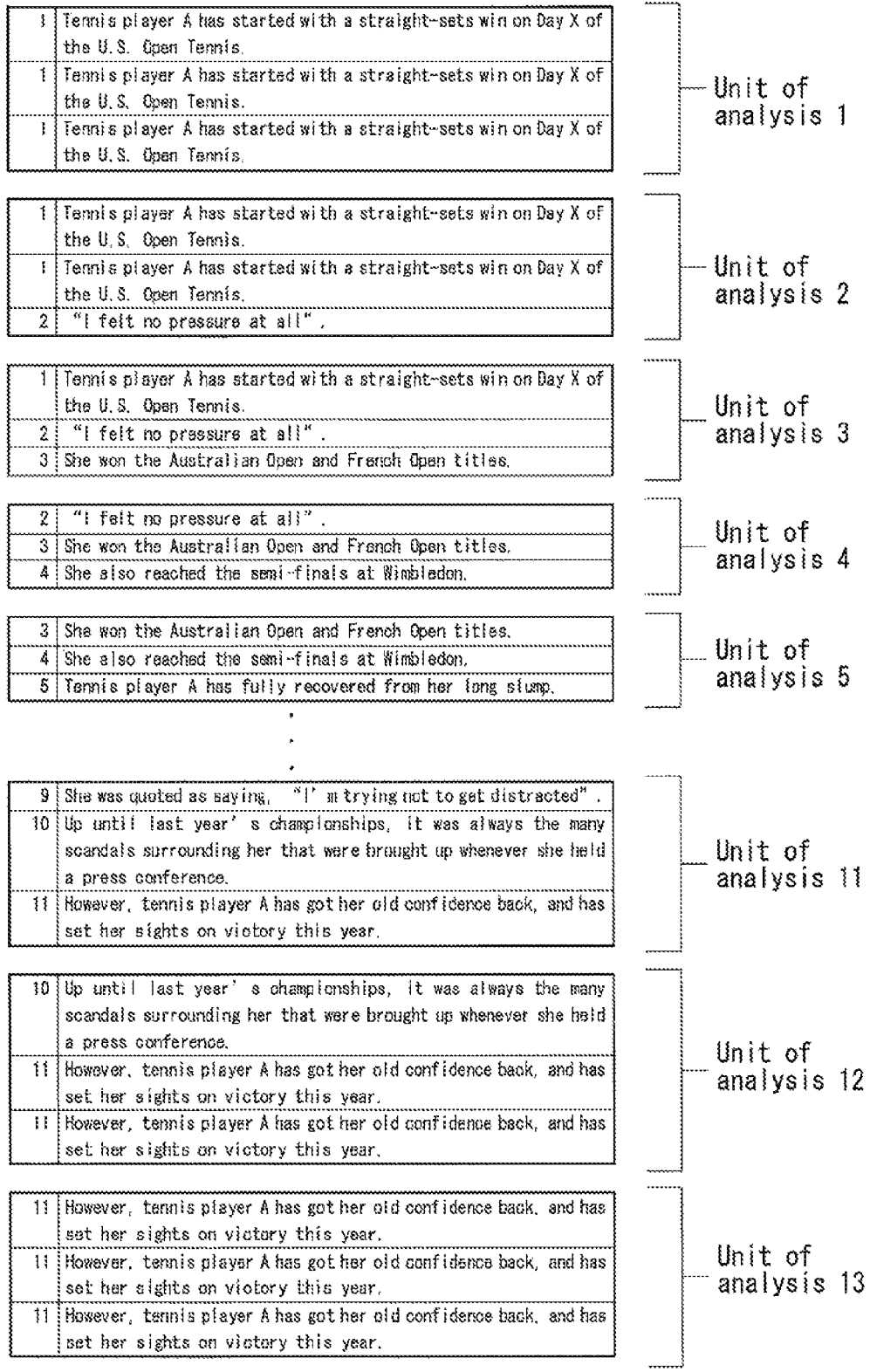
FIG. 3 is a diagram showing an example of units of analysis that have been set for the text information shown in FIG. 2.

Following is a description of an information analysis apparatus and an information analysis method according to Exemplary embodiment 1 of the present invention with reference to FIGS. 1 to 11. First is a description of the configuration of the information analysis apparatus according to Exemplary embodiment 1 with reference to FIGS. 1 to 3. FIG. 1 is a block diagram showing a schematic configuration of the information analysis apparatus according to Exemplary embodiment 1 of the present invention. FIG. 2 is a diagram showing an example of text information targeted for analysis. FIG. 3 is a diagram showing an example of units of analysis that have been set for the text information shown in FIG. 2.

An information analysis apparatus 5 shown in FIG. 1 performs an analysis on text information so as to determine whether or not the text information corresponds to target information. One example of such text information is as shown in FIG. 2. One example of the target information in this case is "information regarding tennis player A".

As shown in FIG. 1, the information analysis apparatus 5 includes a density estimation unit 51 and a determination unit 52. The density estimation unit 51 estimates, in units of analysis each composed of a plurality of sentences of text information, a density indicating the degree to which the target information is included in the unit of analysis. For example, the density estimation unit 51 estimates the density in units of analysis shown in FIG. 3. The determination unit 52 obtains, for each sentence included in each unit of analysis, an evaluation value indicating the degree to which the sentence corresponds to the target information from the estimated density of the unit of analysis, and determines whether or not the sentence is the target information based on the obtained evaluation value. Note that in the following description, a sentence corresponding to the target information is referred to as a "target information descriptive sentence".

In this way, the information analysis apparatus 5 estimates the density of target information in units of analysis each composed of a plurality of sentences of text information. A unit of analysis that contains pieces of target information in clusters will have a high estimated density and, conversely, a unit of analysis that contains few pieces of target information will have a low estimated density. In other words, the densities estimated for each unit of analysis are values that take into consideration information contained in neighboring sentences, and therefore the information analysis apparatus 5 is capable of taking into consideration the tendency of appearance of the target information.

The information analysis apparatus 5 further evaluates the ultimate similarity of each sentence to the target information (calculates the evaluation value) from the density of a unit of analysis that includes the sentence, and then determines whether or not the sentence is a target information descriptive sentence. In other words, even if there is a unit of analysis with a high density, it does not mean that all sentences contained in the unit of analysis will be determined as a target information descriptive sentence. The information analysis apparatus 5 is capable of making comprehensive determination in units of single sentences from the results for a plurality of units of analysis.

Also, as shown in FIG. 1, the information analysis apparatus 5 according to Exemplary embodiment 1 further includes an input unit 1, a unit-of-analysis generation unit 50, and a storage device 4 and is connected to a display device 6 and an input device 10. The input device 10 is a device for inputting information to the input unit 1, and specific examples thereof include a keyboard and a mouse. Alternatively, the input device 10 may be mounted on a different computer device that is connected to the information analysis apparatus 5 via a network.

The display device 6 is a device for showing analysis results obtained by the information, analysis apparatus 5 to a user. The display device 6 displays the results of determining a target information descriptive sentence in response to the instruction given from the determination unit 52 by displaying only target information descriptive sentences or displaying target information descriptive sentences in an emphasized manner. Specific examples of the display device 6 include a display device such as a liquid crystal display, and a printer. Alternatively, the display device 6 may be mounted on a different computer device that is connected to the information analysis apparatus 5 via a network.

The input unit 1 receives an input of information from the input device 10 such as text information targeted for analysis or user-specified information. Upon receiving text information targeted for analysis from the input device 10, the input unit 1 inputs and stores the text information in the storage device 4. The input unit 1 further notifies the unit-of-analysis generation unit 50 of the receipt of the text information.

The storage device 4 includes an input text storage unit 40 that stores received text information, a density estimation model storage unit 41 that stores a density estimation model, and a determination model storage unit 42 that stores a determination model. In Exemplary embodiment 1, although the storage device 4 is provided in the information analysis apparatus 5 and constitutes part of the information analysis apparatus 5, the storage device 4 may be a separate device from the information analysis apparatus 5 and may be connected to the information analysis apparatus 5 via a network.

The input text storage unit 40 stores text information that has been input from the input device 10 via the input unit 1 as mentioned above. It is sufficient if this text information is, for example, text data as shown in FIG. 2, and includes one or more articles each composed of one or more sentences. The density estimation model storage unit 41 stores a density estimation model that has been input from the input device 10 via the input unit 1. In Exemplary embodiment 1, the density estimation unit 51 estimates the density of target information in the text information, using the density estimation model. The density estimation model may, for example, be a function that has the property of outputting a higher score the higher the value estimated for the frequency or reliability of the target information contained in an input unit of analysis. Note that the description of "unit of analysis" will be given later along with the description of the unit-of-analysis generation unit 50. Also, a concrete example of the density estimation model will be disclosed in the description of the density estimation unit 51.

The determination model storage unit 42 stores a determination model that has been input from the input device 10 via the input unit 1. In Exemplary embodiment 1, the determination unit 52, using the determination model, ultimately determines whether or not each sentence is a target information descriptive sentence from the text information and the estimated density. The determination model may, for example, be a function that enables evaluation based on the similarity of each sentence to the target information (evaluation value indicating the degree to which each sentence corresponds to the target information). Note that the similarity of each sentence to the target information can be obtained from each unit of analysis and the result of the estimated density of the unit of analysis. A concrete example of the determination model will be disclosed in the description of the determination unit 52.

The unit-of-analysis generation unit 50 generates a plurality of units of analysis (see FIG. 3) from text information (see FIG. 2). In Exemplary embodiment 1, the unit-of-analysis generation unit 50 first extracts text information from the input text storage unit 40, further generates a plurality of units of analysis each composed of a plurality of sentences, for each article included in the text information, and inputs the generated units of analysis to the density estimation unit 51. Each sentence is thus included in one of the units of analysis.

Also, in Exemplary embodiment 1, the unit-of-analysis generation unit 50 generates units of analysis in accordance with preset conditions (setting conditions). Specifically, for example, the unit-of-analysis generation unit 50 may generate a plurality of units of analysis, such that a sentence included in each unit of analysis coincides with a sentence included in another unit of analysis, that is, duplication of sentences is allowed. In this way, in the case where units of analysis are generated while allowing duplication of sentences, each sentence belongs to a plurality of units of analysis. This allows the determination unit 52 to use a plurality of densities and a change in density as factors of determination for each sentence, thus improving the accuracy of determination performed by the determination unit 52.

Alternatively, the unit-of-analysis generation unit 50 may generate a plurality of units of analysis by, for each unit of analysis, extracting a preset number (W) of consecutive sentences from a plurality of consecutive sentences of the text information and generating the unit of analysis from the extracted consecutive sentences. In this way, if each unit of analysis is composed of a fixed number of sentences, it is no longer necessary for the analysis density estimation unit 51 to perform adjustment taking into consideration the number of sentences. Accordingly, the construction of the density estimation model is relatively easier than in the case where each unit of analysis is not composed of a fixed number of sentences.

The unit-of-analysis generation unit 50 may also generate a plurality of units of analysis by, for each unit of analysis, extracting a preset number of consecutive sentences from a plurality of sentences of the text information and generating the unit of analysis from the extracted consecutive sentences, such that a sentence in each unit of analysis coincides with a sentence in another unit of analysis. That is, the unit-of-analysis generation unit 50 may generate a plurality of units of analysis by extracting a plurality of consecutive sentences while allowing duplication of sentences. In this case, the aforementioned two effects can be achieved at the same time.

Furthermore, in the case where a plurality of sentences of the text information are numbered consecutively as shown in FIG. 2, the unit-of-analysis generation unit 50 may generate units of analysis each composed of the same number of sentences, while shifting the sentence number by a number smaller than a predetermined number (W) of sentences. That is, as shown in FIG. 3, the unit-of-analysis generation unit 50 may generate a plurality of units of analysis by extracting a preset number of consecutively numbered sentences, such that the number of the beginning or end sentence to be extracted shifts by a preset number for each unit of analysis. Note that in this case as well, the unit-of-analysis generation unit 50 extracts a plurality of consecutive sentences while allowing duplication of sentences.

Specifically, in the example of FIG. 3, in order for each unit of analysis to contain the same number of sentences, the first sentence (sentence ID=1) is added (W−1) times to the beginning of the article, and the last sentence (sentence ID=11) is added (W−1) times to the end of the article. Also, in the example of FIG. 3, the unit-of-analysis generation unit 50 generates a plurality of units of analysis in accordance with the following setting conditions.

For example, a description is given of setting conditions in the case where the text information includes N consecutive sentences numbered from 1 to N, and a plurality of units of analysis each include W sentences. In this case, the unit-of-analysis generation unit 50 generates (N+W−1) units of analysis numbered from 1 to (N+W−1). At this time, the unit-of-analysis generation unit 50 generates the 1st unit of analysis from W 1st sentences, and generates each of the 2nd to (W−1)th units of analysis from the 1st sentence, a sentence whose number is smaller than the number of the unit of analysis, and a sentence whose number is the same as the number of the unit of analysis.

Also, the unit-of-analysis generation unit 50 generates each of the Wth to Nth units of analysis by extracting W sentences numbered consecutively, while shifting the number of the beginning sentence by one for each unit of analysis, such that the number of the last sentence is the same as the number of the unit of analysis. Furthermore, the unit-of-analysis generation unit 50 generates each of the (N+1)th to (N+W−2)th units of analysis from a sentence whose number is smaller than N and the Nth sentence, and generates the (N+W−1)th unit of analysis from W Nth sentences. Note that the example in FIG. 3 is equivalent to the case where N=11 and W=3 in the aforementioned setting conditions.

In Exemplary embodiment 1, the density estimation unit 51 reads out a density estimation model from the density estimation model storage unit 41 and, in accordance with the density estimation model, estimates the density in units of analysis generated by the unit-of-analysis generation unit 50.

The density estimation unit 51 further adds density information to each unit of analysis and outputs the result to the determination unit 52. One concrete example of the density estimation model according to Exemplary embodiment 1 is a function that outputs the frequencies of related words contained in each unit of analysis based on a list of words related to the target information (hereinafter referred to as a "related word list").

Another example of the density estimation model is a function that integrates the degree of importance of a related word appearing in each unit of analysis based on a related word list in which the importance of each related word has been set, and outputs the obtained integrated value. Still another example of the density estimation model is a function that, based on a related word list in which related words are represented by vectors, outputs the "degree of similarity" between a vector in the related word list and a vector indicating the appearance of a word in each unit of analysis. Note that such a related word list may be created in advance by somebody or may be automatically generated in advance by machine processing.

One typical example of the degree of similarity is cosine similarity. Also, in the case where weighting is performed on a vector or a related word, the TFIDF method, which is a typical word-weighting method, may be used, for example. TFIDF is obtained by multiplying TF (term frequency, which is the frequency of appearance of a word in an article) and IDF (inverse document frequency, which is the logarithm of a quotient of the total number of articles and the number of articles that include the word). With the TFIDF method, it is possible to assign a high value to a word that is likely to appear in a certain article, but appears in only a small number of documents.

In Exemplary embodiment 1, the determination unit 52 reads out a determination model from the determination model storage unit 42 and receives the units of analysis to which estimated density information has been added by the density estimation unit 51. The determination unit 52 then evaluates, in accordance with the determination model, the similarity of each sentence to the target information based on the densities of the units of analysis to which the sentence belongs, and determines, using the evaluation results, whether or not the sentence is the target information. Thereafter, the determination unit 52 generates display data for displaying, on the display device 6, sentences to which determination results have been attached and outputs the display data to the display device 6.

In Exemplary embodiment 1, one example of the determination model is a function that calculates an evaluation value for each sentence using the densities of the units of analysis that include the sentence (to which the sentence belongs) and, if the evaluation value exceeds a predetermined threshold value (or is greater than or equal to the threshold value), determines the sentence as a target information descriptive sentence. Specifically, the determination model may, for example, be a function that obtains, for each sentence included in a plurality of units of analysis, the sum of the densities of the units of analysis including the sentence and, if the obtained value (evaluation value for the sentence) exceeds a threshold value, determines the sentence as a target information descriptive sentence. Another example of the determination model is a function that obtains the average or standard deviation of the densities, instead of the sum of the densities.

Still another example of the determination model is a function that uses two or more of the sum of the densities, the average of the densities, and the standard deviation of the densities. One example is a function that calculates, for each sentence, an average value of the densities of the units of analysis to which the sentence belongs, and a standard deviation of the densities, and uses a value obtained by subtracting a constant multiple (predetermined parameter) of the standard deviation from the average value or a value obtained by adding the average value and a constant multiple of the standard deviation. With such a determination model, when the value obtained by the subtraction or the value obtained by the addition exceeds a predetermined threshold value (or is greater than or equal to the threshold value), the sentence is determined as the target information.

In the case of utilizing a determination model that uses the value obtained by adding the average value and a constant multiple of the standard deviation, it is possible to take into consideration variations in the estimated density values. Such a determination model is effective for the case where the estimated density values vary greatly. Furthermore, in order for determination results to include as few errors as possible, it is better to utilize a determination model that uses the value obtained by subtracting a constant multiple of the standard deviation from the average value. Conversely, in the case where the determination of whether or not a sentence is a target information descriptive sentence is to be made for as many sentences as possible even though some errors might be included, it is better to utilize a determination model that uses the value obtained by adding a constant multiple of the standard deviation.

Furthermore, in Exemplary embodiment 1, although the determination unit 52 basically makes determination in accordance with the aforementioned determination model, it is also possible to make determination using other criteria, in addition to the determination in accordance with the determination model. For example, in the case where a certain unit of analysis that includes a certain sentence targeted for determination has a considerably low density as compared with the other units of analysis, the determination unit 52 may determine that the sentence is not the target information. Such determination is based on the idea that, if the density of a unit of analysis is considerably reduced in the case where a certain sentence is removed from the unit of analysis or where another sentence is added to the unit of analysis, sentences contained in the unit of analysis having the reduced density are less likely to be the target information.

As another example, the determination unit 52 may make determination using, as a feature quantity of each unit of analysis, one or more types of information that include information obtained from words or clauses in each sentence contained in the unit of analysis and information acquired by comparing the text information and the sentence. In this case as well, the determination unit 52 also makes determination using the estimated density value of each unit of analysis in accordance with the determination model.

A specific example is that, in the case of using the estimated density value of each unit of analysis and the information obtained from words or clauses in each sentence, "the determination unit 52 does not determine a sentence that contains a specific word as the target information, even though the sentence is contained in a unit of analysis having a high density". Another example is that, in the case of using the estimated density value of each unit of analysis and the information acquired by comparing the text information and each sentence, "the determination unit 52 determines, as the target information, a sentence that is included in a unit of analysis having a low density, but includes a word that is the same as or similar to a word included in a unit of analysis having a high density".

Note that in Exemplary embodiment 1, the information analysis apparatus 5 may not include the unit-of-analysis generation unit 50. For example, in the case where the text information that has been input from the input device 10 has units of analysis each composed of a plurality of sentences, generated therein in some way in advance, the information analysis apparatus 5 does not need to include the unit-of-analysis generation unit 50.

Figure 4:
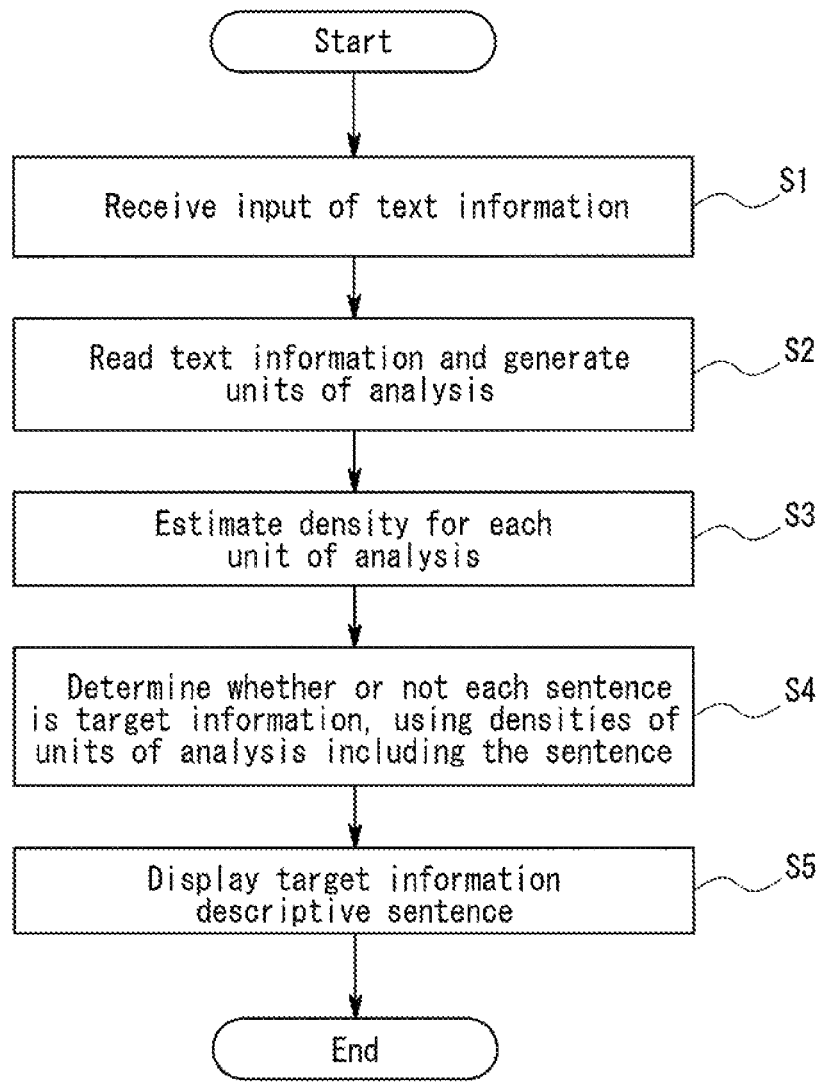
FIG. 4 is a flowchart showing an information analysis method according to Exemplary embodiment 1 of the present invention.

Next is a description of the information analysis method according to Exemplary embodiment 1 of the present invention with reference to FIGS. 4 to 11. FIG. 4 is a flowchart showing the information analysis method according to Exemplary embodiment 1 of the present invention. Note that the information analysis method according to Exemplary embodiment 1 is implemented by operating the information analysis apparatus 5 shown in FIG. 1 according to Exemplary embodiment 1. Therefore, the following description is given along with the description of the operation of the information analysis apparatus 5 with reference to FIGS. 1 to 3 where appropriate.

Note that in Exemplary embodiment 1, the target information is set to "information regarding tennis player A" as mentioned above. A concrete example of the density estimation model is described along with processing performed by the density estimation unit 51 (step S3 in FIG. 4). A concrete example of the determination model is described along with processing performed by the determination unit 52 (step S4 in FIG. 4).

The following description is given taking as an example the case where, as shown in FIG. 3, the unit-of-analysis generation unit 50 generates a plurality of units of analysis by, for each unit of analysis, extracting a preset number of consecutively numbered sentences, such that the number of the beginning or end sentence to be extracted shifts by a preset number for each unit of analysis. This is the most effective example in the case of using the density estimation unit 51 and the determination unit 52 in combination.

In other words, in this example as well, units of analysis are configured while allowing duplication of sentences, and accordingly each sentence belongs to a plurality of the generated units of analysis. Thus, as previously described, the determination unit 52 is capable of using a plurality of densities and a change in density as factors in making determination. In addition, since each unit of analysis is composed of a fixed number of sentences, the density estimation unit 51 does not need to perform adjustment taking into consideration the number of sentences. The construction of the density estimation model is thus relatively easier than in the case where each unit of analysis is not composed of a fixed number of sentences.

As shown in FIG. 4, upon input of text information from the input device 10, the input unit 1 first receives the text information and stores this text information targeted for extraction of the target information in the input text storage unit 40 (step S1). In this case, the input text storage unit 40 stores the text information as shown in FIG. 2.

In step S1, the text information is stored in records as shown in FIG. 2, each single record containing three items including "Article ID", which is an identifier of the article, "Sentence ID", which is the number starting from 1 and assigned in order of appearance to the beginning to end sentences of the article, and "Sentence" where the text of the sentence is stored. For example, it can be seen from FIG. 2 that the beginning sentence of the article with article ID=1 says that "Tennis player A started with a straight-sets win on Day X of the U.S. Open Tennis".

Next, the unit-of-analysis generation unit 50 reads the text information from the input text storage unit 40 and generates units of analysis each composed of a fixed number (parameter W) of sentences, while shifting one sentence at a time from the first sentence of each article (step S2). The unit-of-analysis generation unit 50 also outputs the generated units of analysis to the density estimation unit 51. Following is a detailed description of step S2 with reference to FIG. 3.

FIG. 3 shows an example where the article with article ID=1 is targeted for generation of units of analysis, where W=3. First, the first sentence is added (W−1) times to the beginning of the article, and the last sentence is added (W−1) times to the end of the article, in order for both of the first and last sentences of the article to be included in W units of analysis, like the other sentences.

Then, units of analysis each composed of W sentences are generated while shifting one sentence at a time from the first sentence of each article, and the result is as shown in FIG. 3. Referring to FIG. 3, it can be seen that unit of analysis 4, which is the fourth unit of analysis, is composed of three sentences with sentence IDs 2, 3, and 4, for example. In the example of FIG. 3, each single sentence belongs to W units of analysis because the units of analysis are generated while shifting one sentence at a time for each units of analysis. Specifically, since W is set to 3, the sentence with sentence ID=2 belongs to three units of analysis 2, 3, and 4, for example.

It should be noted that in Exemplary embodiment 1, as previously described, the unit-of-analysis generation unit 50 is not necessarily required as a constituent element. Therefore, in the case where the text information stored in the input text storage unit 40 through the input unit 1 is configured in some way by a group of units of analysis each composed of a plurality of sentences (see FIG. 5), the processing performed by the unit-of-analysis generation unit 50 (step S2) is unnecessary.

FIG. 5 is a diagram showing an example of the text information stored in the input text storage unit shown in FIG. 1 in a state where units of analysis have been set in advance. The text information shown in FIG. 5 is input from the input device 10 in a state where it has been processed in advance using the same method as described above, and is then stored in the input text storage unit 40 by the input unit 1. As shown in FIG. 5, the text information includes "Unit-of-analysis ID" indicating the ID of the unit of analysis, "Article ID" indicating the identifier of the article in which the sentence that belongs to each unit of analysis appears, and "Sentence" indicating the text of the sentence. Referring to FIG. 5, it can be seen that the unit of analysis with unit-of-analysis ID=4 is composed of three sentences with sentence IDs 2, 3, and 4, for example.

Next, the density estimation unit 51 reads out a density estimation model from the density estimation model storage unit 41 and, in accordance with the read density estimation model, estimates a target information density in units of analysis generated by the unit-of-analysis generation unit 50 (step S3). The density estimation unit 51 also outputs the units of analysis and the estimation results of the densities of the units of analysis to the determination unit 52.

In Exemplary embodiment 1, a function that outputs the number of sentences in which words included in a pre-created word list appear is used as the density estimation model in step S3. FIG. 6 is a diagram showing an example of such a word list used in the density estimation model stored in the density estimation model storage unit shown in FIG. 1. As shown in FIG. 6, a plurality of words are recorded in the word list. Specifically, the word list shown in FIG. 6 is made up of words regarding the games of tennis because the target information is information regarding tennis player A.

Here is a concrete description of the processing performed in step S3 on the article with article ID=1 shown in FIG. 3, with reference to FIG. 7. FIG. 7 is a diagram illustrating how densities are estimated. The table shown in FIG. 7 shows the result of comparison between each sentence in the article with article ID=1 shown in FIG. 3 and the word list shown in FIG. 6. In the table shown in FIG. 7, "1" is attached to a sentence that contains a word included in the word list in FIG. 6, and "0" is attached to a sentence that contains none of the words included in the word list. For example, in the sentence with article ID=1 and sentence ID=1, words such as "tennis", "U.S. Open", and "tennis player A" that are included in the word list appear and accordingly "1" is entered in the "word appearance" field for this sentence.

Note that the "Y/N" field in FIG. 7 contains information that has been added for explanation. Y denotes that the sentence corresponds to a target information descriptive sentence, and N denotes that the sentence does not correspond to a target information descriptive sentence. It is to be noted that information in the "Y/N" field in FIG. 7 is not information that has been held in the system, but information to be determined by the system.

FIG. 8 is a diagram showing an example of units of analysis whose densities have been estimated. As shown in FIG. 8, the density estimation unit 51 estimates the density for each unit of analysis shown in FIG. 3. As previously described, the density estimation model is a function that outputs the number of sentences that contain a word included in the word list shown in FIG. 6. Accordingly, for example, the density of unit of analysis 3 is "2" because sentences 1 and 3 each include a word in the word list as shown in FIG. 8. The density of unit of analysis 4 is "1" because only sentence 3 includes words in the word list. In this way, the density estimation unit 51 estimates the target information density in units of analysis, and outputs the units of analysis and the estimation results of the densities of the units of analysis to the determination unit 52.

Next, the determination unit 52 reads out a determination model from the determination model storage unit 42, calculates an evaluation value for each sentence based on the densities of the target information estimated by the density estimation unit 51, and determines, using the evaluation value, whether or not the sentence is the target information (step S4). The determination unit 52 also creates display data for displaying the sentences and determination results for the sentences, and outputs the generated display data to the display device 6.

In the example shown in FIG. 4, it is assumed that the determination model is a function that calculates, as an evaluation value for each sentence, the sum of the estimated density values of the units of analysis to which the sentence belongs and, if the calculated evaluation value is greater than or equal to three that has been set as a threshold value, determines the sentence to be the target information. FIG. 9 is a diagram showing an example of the evaluation values calculated for each sentence. For example, referring to FIG. 8, which shows an example of the density estimation results for each units of analysis, the sentence with article ID=1 and sentence ID=3 is included in "units of analysis 3, 4, and 5". Accordingly, as shown in FIG. 9, the evaluation value for the sentence with sentence ID=3 is calculated to be the sum of 2, 1, and 2, which are the density estimation results for units of analysis 3, 4, and 5, that is, 5 (=2+1+2).

The evaluation value for each sentence is calculated similarly and the result is as shown in FIG. 9. Ultimately, in the example of FIG. 9, the sentences whose evaluation value is greater than or equal to a threshold value of 3, namely, the sentences with sentence IDs 1 to 7, 10, and 11, are determined as target information descriptive sentences.

FIG. 10 is a diagram showing an example of determination results indicating whether or not the sentence is a target information descriptive sentence. In the "determination result" field in the table shown in FIG. 10, "Y" is entered for a sentence that has been determined as a target information descriptive sentence according to the result shown in FIG. 9, and "N" for a sentence that has been determined as not being a target information descriptive sentence. Also, the "determination based on word appearance" field in the table shown in FIG. 10 designates the determination result indicating whether or not the sentence includes a word in the word list shown in FIG. 6. It can be seen from the comparison between this determination result and the determination result in the "Y/N" field in the table shown in FIG. 10 that, with the method according to Exemplary embodiment 1, in which neighboring information is taken into consideration, it is possible to find out a greater number of target information descriptive sentences than in the case of using a method for making independent determination of each sentence.

Thereafter, upon receiving display data from the determination unit 52, the display device 6 displays the results of determination of target information descriptive sentences on a display screen (step S5). When the display by the display device 6 ends, the processing performed by the information analysis apparatus 5 ends as well.

FIG. 11 is a diagram showing an example of the display result. In the example of FIG. 11, the article ID, the sentence ID, the sentence content, and the evaluation value are displayed on a display screen for each sentence that has been determined as a target information descriptive sentence. For example, referring to the sentence with article ID=1 and sentence ID=3, i.e., "She won the Australian Open and French Open titles", it is found that the sentence has been determined to be a target information descriptive sentence because the evaluation value is 5.

In this way, with the information analysis apparatus 5 and the information analysis method according to Exemplary embodiment 1, it is possible to make per-sentence determination, that is, determine, in units of single sentences, whether or not each sentence is a target information descriptive sentence, while taking into consideration the tendency of target information to appear consecutively. Furthermore, in Exemplary embodiment 1, the provision of the unit-of-analysis generation unit 50 in the information analysis apparatus 5 eliminates the need to generate units of analysis in advance on the input device 10 side.

Exemplary Embodiment 2

Figure 12:
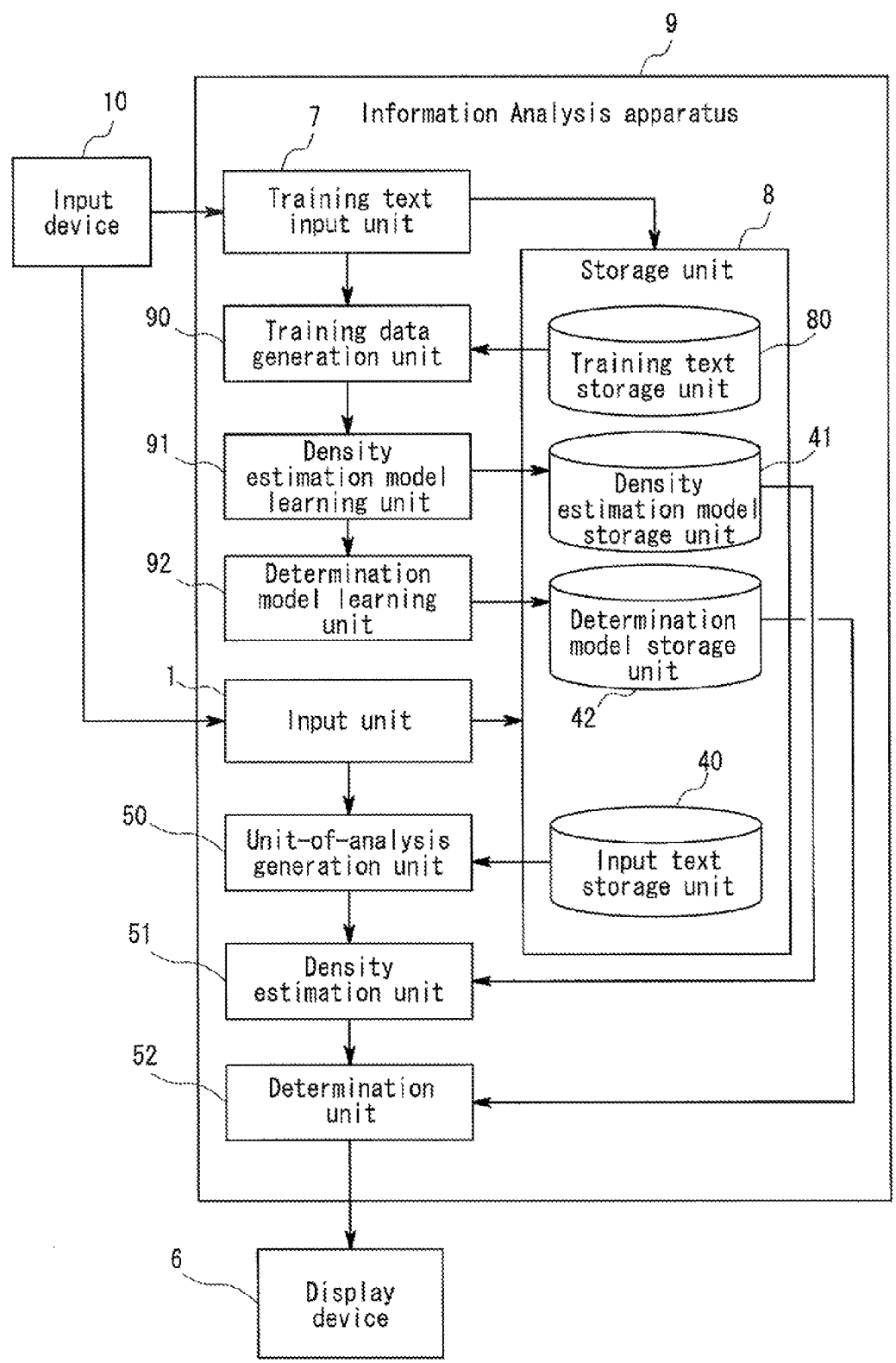
FIG. 12 is a block diagram showing a schematic configuration of an information analysis apparatus according to Exemplary embodiment 2 of the present invention.

Next is a description of an information analysis apparatus and an information analysis method according to Exemplary embodiment 2 of the present invention with reference to FIGS. 12 to 16. First is a description of the configuration of the information analysis apparatus according to Exemplary embodiment 2 with reference to FIGS. 12 and 13. FIG. 12 is a block diagram showing a schematic configuration of the information analysis apparatus according to Exemplary embodiment 2 of the present invention. FIG. 13 is a diagram showing an example of training text information.

As shown in FIG. 12, an information analysis apparatus 9 according to Exemplary embodiment 2 further includes, in addition to the configuration of the information analysis apparatus 5 according to Exemplary embodiment 1, a training text input unit 7, a training data generation unit 90, a density estimation model learning unit 91, and a determination model learning unit 92. The remaining parts of the information analysis apparatus 9 are configured in the same way as the information analysis apparatus 5 according to Exemplary embodiment 1. A storage device 8 further includes a training text storage unit 80 in addition to the configuration of the storage device 4 according to Exemplary embodiment 1. The remaining parts of the storage device 8 are also configured in the same way as the storage device 4.

In Exemplary embodiment 2, the input device 10 outputs, in addition to text information (see FIG. 2) targeted for analysis, training text information that is used to learn a density estimation model and a determination model. The training text input unit 7 receives an input of the training text information and stores the training text information in the training text storage unit 80. As shown in FIG. 13, the training text information includes the article ID, the sentence ID, the sentence (content), and information indicating whether the sentence is target information. As an example of the information indicating whether or not the sentence is target information, a symbol indicating whether or not each sentence is target information or a value indicating the similarity of each sentence to the target information is used.

The training data generation unit 90 reads out training text information (see FIG. 13) from the training text storage unit 80, generates training data that is used to learn a density estimation model and a determination model, and inputs the generated training data to the density estimation model learning unit 91 and the determination model learning unit 92.

In Exemplary embodiment 2, the training data generation unit 90 generates a plurality of units of training each composed of a plurality of sentences, from the training text information in accordance with setting conditions. The training data generation unit 90 also sets, in units of training, a target information density indicating the amount of target information included in the unit of training, with reference to the information indicating whether or not each sentence in the unit of training is the target information.

The training data generation unit 90 further obtains, for each unit of training, a feature quantity from information acquired from words or clauses in each sentence contained in the unit of training, and generates training data (see FIG. 15 discussed later) from the target information densities and the feature quantities of the units of training. At this time, instead of or along with the above information, the training data generation unit 90 may obtain the feature quantity from information acquired by comparing the training text information and each sentence in each unit of training.

In this way, in Exemplary embodiment 2, the training data is configured by a group of sets of a feature representation (feature quantity), which has been obtained by converting each unit of training in a form readable by a learning algorithm, and the target information density of the unit of training. Typical examples of the feature representation include a feature representation in a vector format, a feature representation in an attribute format, and a feature representation in a table format of attribute values.

Also, in the case where a symbol indicating whether or not each sentence is target information is given as "target information" in the training text information, the number of sentences that contain target information may be used as a target information density of each unit of training. Furthermore, in the case where a value indicating the similarity of each sentence to the target information is given as "target information", the sum of values indicating the similarity of each sentence of each unit of training to the target information may be used as the target information density of the unit of training.

In Exemplary embodiment 2, the training data generation unit 90 generates units of training in the same way as the unit-of-analysis generation unit 50 generates units of analysis. Therefore, the training data generation unit 90 may allow duplication of sentences when generating units of training each composed of a plurality of sentences. Also, the training data generation unit 90 may generate units of training by, for each unit of training, extracting a preset number (W) of consecutive sentences from a plurality of consecutive sentences of the training text information and generating the unit of training from the extracted consecutive sentences. Furthermore, the training data generation unit 90 may generate units of training by, for each unit of training, extracting a predetermined fixed number of consecutive sentences while allowing duplication of sentences.

In this way, configuring units of training while allowing duplication of sentences allows each sentence to belong to a plurality of units of training, thus achieving the effect of increasing the number of information pieces used by the determination model learning unit 92 in learning a determination model. Also, the generation of units of training each composed of a fixed number of sentences, stabilizes a feature quantity (discussed later) used by the density estimation model learning unit 91 in learning a density estimation model. In this case, the results of estimation using the learned density estimation model are stabilized as well.

Furthermore, in the case where the plurality of sentences of the training text information are numbered consecutively, the training data generation unit 90 may generate units of training each composed of the same number of sentences, while shifting the sentence number by a number smaller than a predetermined number (W) of sentences for each unit of training. In other words, the training data generation unit 90 may generate a plurality of units of training by, for each unit of training, extracting a preset number of consecutively numbered sentences, such that the number of the beginning or end sentence to be extracted shifts by a preset number for each unit of training.

Specifically, in this case, the first sentence (with sentence ID=1) is added (W−1) times to the beginning of the article, and the last sentence (with sentence ID=11) is added (W−1) times to the end of the article, such that each unit of training contains the same number of sentences. Also, in the above case, like the unit-of-analysis generation unit 50, the training data generation unit 90 is capable of generating units of training depending on the order of the units of training. In other words, the training data generation unit 90 is capable of generating units of training with different conditions when generating the 1st unit of training, when generating the 2nd to (W−1)th units of training, when generating the Wth to Nth units of training, when generating the (N+1)th to (N+W−2)th units of training, and when generating the (N+W−1)th unit of training.

The density estimation model learning unit 91 receives the training data generated by the training data generation unit 90 and, using the training data, learns a density estimation model used in the density estimation performed by the density estimation unit 51. The density estimation model learning unit 91 also stores the learned density estimation model in the density estimation model storage unit 41. Furthermore, in Exemplary embodiment 2, the density estimation model learning unit 91 estimates a density indicating the degree to which the target information is included in each unit of training included in each training data, using the learned density estimation model. Then, the density estimation model learning unit 91 outputs sets of the units of training and the densities estimated in units training (estimated densities) to the determination model learning unit 92.

Specifically, the construction of the density estimation model learning unit 91 can be performed using an arbitrary classifier-function learning algorithm or regression-function learning algorithm. For example, in the case where the densities estimated by the density estimation unit 51 are expressed by a small number of discrete values, the construction of the density estimation model learning unit 91 can be performed using either the regression-function learning algorithm or the classifier-function learning algorithm. In the case where the densities estimated by the density estimation unit 51 are expressed by continuous values, the construction of the density estimation model learning unit 91 can be performed using the regression-function learning algorithm.

The density estimation model learning unit 91 may divide the training data generated by the training data generation unit 90 into two parts, use one part of the training data to learn a density estimation model, and using the density estimation model, estimate the densities of units of training included in the other part of the training data. In this case, the density estimation model learning unit 91 outputs the respective units of training and the estimated values of the densities of the other units of training to the determination model learning unit 92. The density estimation model learning unit 91 further outputs the training data to the determination model learning unit 92.

Here is a description of the effect achieved in the case where the training data is divided into two parts. The density estimation model learning unit 91, depending on the learning algorithm provided therein, is capable of precisely estimating all densities for the training data used for learning. From this, if the same training data is used to learn a density estimation model and to learn a determination model (discussed later), all densities estimated for the training data, which are to be transmitted to the determination model learning unit 92, are precise as well.

Accordingly, in the above case, the determination model learning unit 92 learns a determination model on the assumption that all the densities have been estimated precisely. However, in reality, with the density estimation model, the density for each unit of analysis cannot always be estimated precisely at the time of analysis. For this reason, the determination model may not work effectively.

It is thus conceivable that the training data is divided into two parts so as to generate unknown data to the density estimation model and generate training data for the determination model learning unit 92 from the unknown data. This prevents the determination model learning unit 92 from overfitting to the training data and accordingly enables the determination unit 52 to more precisely determine whether or not a sentence is a target information descriptive sentence.

The determination model learning unit 92 generates feature data from the densities estimated by the density estimation model learning unit 91 and the training data and, using the feature data, further learns a determination model usable in the determination performed by the determination unit 52. Also, in Exemplary embodiment 2, the determination model may preferably be a function that determines whether each sentence is the target information upon receiving an input of the estimated values of the densities (estimated densities) of each unit of analysis that include the sentence. The determination model learning unit 92 stores the learned determination model in the determination model storage unit 42.

Also, in Exemplary embodiment 2, the determination model learning unit 92 obtains, for a sentence included in a plurality of units of training, at least one of the sum, average, and dispersion of the estimated densities of the units of training including the sentence. Then, the determination model learning unit 92 can generate feature data (see FIG. 16 discussed later) using the obtained value and one or more types of information that include information acquired from words or clauses in each sentence included in the units of training and information acquired by comparing the training text information and each sentence included in the units of training.

The feature data generated by the determination model learning unit 92, along with the information indicating whether or not each sentence is target information, are usable as data for generating a determination model. The feature data may be expressed in a format such as a vector format, an attribute format, and a table format of attribute values. In Exemplary embodiment 2, the feature data is generated as a feature vector.

Also, in Exemplary embodiment 2, it is preferable that setting conditions used by the training data generation unit 90 in generating units of training be the same setting conditions as used by the unit-of-analysis generation unit 50 in generating units of analysis. Furthermore, a configuration is possible in Exemplary embodiment 2 in which only one of the density estimation model and the determination model is to be learned. In this case, the other model is created separately as in Exemplary embodiment 1 and is stored in the storage device 8 by the input device 10 from an external source. Note that the following description gives a configuration in which both of the density estimation model and the determination model are to be learned.

Figure 14:
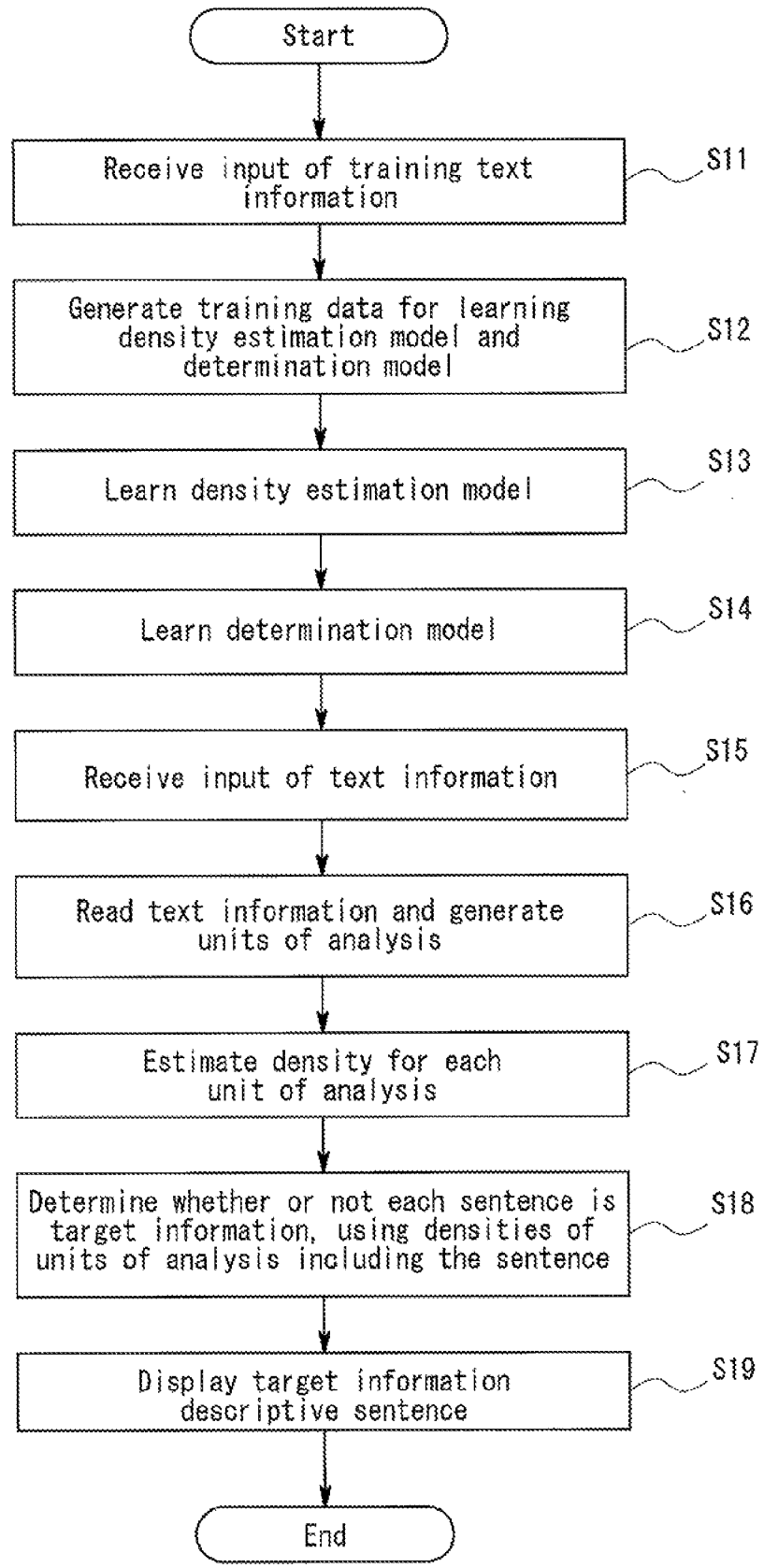
FIG. 14 is a flowchart showing an information analysis method according to Exemplary embodiment 2 of the present invention.
Figure 15:
FIG. 15 is a diagram showing an example of training text information for which units of training have been set, and an example of training data.

Next is a description of the information analysis method according to Exemplary embodiment 2 of the present invention with reference to FIGS. 14 to 16. FIG. 14 is a flowchart showing the information analysis method according to Exemplary embodiment 2 of the present invention. Note that the information analysis method according to Exemplary embodiment 2 is implemented by operating the information analysis apparatus 9 of Exemplary embodiment 2 shown in FIG. 12. Thus, the following description is given along with the description of the operation of the information analysis apparatus 9 with reference to FIGS. 12 and 13 where appropriate.

Assume that, in Exemplary embodiment 2 as well, the target information is set to "information regarding tennis player A" similarly to Exemplary embodiment 1. The following description is given of the case where the training data generation unit 90, like the unit-of-analysis generation unit 50 of Exemplary embodiment 1, generates a plurality of units of training by, for each unit of training, extracting a preset number of consecutively numbered sentences, such that the number of the beginning or end sentence to be extracted shifts by a preset number for each unit of training (see FIG. 3).

Also, as previously described, configuring the units of analysis while allowing duplication of sentences achieves the effect of increasing the number of information pieces used by the determination model learning unit 92 in learning a determination model. Furthermore, the generation of units of training each composed of a fixed number of sentences, stabilizes the feature quantity used by the density estimation model learning unit 91 in learning a density estimation model. In this case, the results of estimation using the learned density estimation model are stabilized as well.

As shown in FIG. 14, upon input of training text information from the input device 10, the training text input unit 7 receives an input of the training text information (see FIG. 13) that will be used in learning a density estimation model and a determination model, and stores the training text information in the training text storage unit 80 (step S11). Note that the training text information shown in FIG. 13 is stored in records, each single record containing four items including "Article ID", which is an identifier of the article, "Sentence ID" assigned in order of appearance to the first to last sentences of the article, "Target Information" indicating by Y or N whether or not each sentence is target information, and "Sentence" where the text of the sentence is stored.

Next, the training data generation unit 90 reads out the training text information from the training text storage unit 80, generates training data that will be used in learning a density estimation model and a determination model, and inputs the generated training data to the density estimation model learning unit 91 and the determination model learning unit 92 (step S12).

Specifically, the training data generation unit 90 generates a plurality of units of training each composed of a fixed number (parameter W) of sentences, while shifting one sentence at a time from the beginning sentence of each article. Then, the training data generation unit 90 converts text of each unit of training in a form readable by a learning algorithm, and acquires a feature quantity (feature representation) of the unit of training. The training data generation unit 90 also sets a target information density in units of training, with reference to a symbol indicating whether or not each sentence is target information or a value indicating the similarity of each sentence to target information. Thereafter, the training data generation unit 90 generates training data from sets of the acquired feature quantities (feature representations) and the set target information densities, and inputs the training data to the density estimation model learning unit 91.

FIG. 15 is a diagram showing an example of the training text information for which units of training have been set, and an example of the training data. The training text information is shown on the left side of FIG. 15, and the training data on the right side. As shown in FIG. 15, in Exemplary embodiment 2, the "number of target information sentences contained in each unit of training" is used as a target information density. Furthermore, a "feature vector including the frequencies of appearance of nouns included in text" is used as the feature quantity of each unit of training, that is, as text data for the learning algorithm.

For example, in the case of the 3rd unit of training from the top of FIG. 15, it can be seen with reference to FIG. 13 that sentences with sentence IDs 1 and 3 included in the unit of training correspond to the target information. Accordingly, the target information density of this unit of training has been determined as "2". Also, the feature vector of this unit of training, which is represented by nouns and the frequencies of appearance of the nouns in the text, is "Tennis=1, Tennis player A=1, U.S.=1, Open=1, Pressure=1, Australian=1, Title=1". Similarly to this, the training data is generated from all pieces of the training text information.

Next, the density estimation model learning unit 91, using the training data received from the training data generation unit 90, learns a function that inputs the feature vectors in the training data and outputs target information densities, in accordance with an arbitrary learning algorithm (step S13). The density estimation model learning unit 91 also stores the learned function as a density estimation model in the density estimation model storage unit 41. The density estimation model learning unit 91, using the density estimation model, further estimates densities for each training data and then inputs the training data for which densities have been estimated and the estimated densities to the determination model learning unit 92.

Note that a method for learning an arbitrary classifier function or regression function may be used as a learning method in step S13. In Exemplary embodiment 2, learning is performed so as to heavily weigh a noun that is likely to be included in training data with high target information densities and, conversely, to lightly weigh a noun that is likely to be included in training data with low target information densities.

Next, the determination model learning unit 92 generates a feature vector of each sentence, using each training data and the estimated densities input from the density estimation model learning unit 91, and learns a function that inputs the feature vector and determines whether or not the sentence is the target information (step S14). The determination model learning unit 92 also stores the learned function as a determination model in the determination model storage unit 42.

Here is a concrete description of step S14 with reference to FIGS. 16 and 17. FIG. 16 is a diagram showing an example of data that is output from the density estimation model learning unit. As shown in FIG. 16, the densities estimated for each unit of training (estimated densities) by the density estimation model learning unit 91 are output to the determination model learning unit 92.

FIG. 17 is a diagram showing an example of data generated by the determination model learning unit 92. The data generated by the determination model learning unit 92 shown in FIG. 17 is used as data for generating a determination model (determination model generating data). As shown in FIG. 17, the determination model generating data includes, as feature quantities, the estimated densities of the units of training that contain sentences estimated using the density estimation model (see the right side of FIG. 16), an average and dispersion of the estimated densities, and words contained in the sentences (only nouns in the example of FIG. 17). The determination model learning unit 92 generates, from the feature quantities, a feature vector of each sentence that is used to determine whether or not the sentence is in reality the target information.

In the example of FIG. 17, "estimated density 1" for each sentence indicates a value estimated, using the density estimation model, for the density of the 1st unit of training that contains the sentence, as viewed from the top of the article. Similarly, "estimated density 2" indicates the estimated density of the 2nd unit of training, and "estimated density 3" indicates the estimated density of the 3rd unit of training. Therefore, in the case of the sentence with sentence ID=1, estimated density 1 is 3.2, estimated density 2 is 2.2, and estimated density 3 is 1.8.

As shown in FIG. 17, for example, the determination model generating data for the sentence with sentence ID=1 includes, as a feature vector, "estimated density 1", "estimated density 2", and "estimated density 3" because the sentence with sentence ID=1 is included in the 1st to 3rd units of training. The determination model generating data also includes, as the feature vector, "average of estimated densities" indicating the average of those three estimated densities, as well as nouns and the frequencies of appearance of the nouns contained in the sentence. Furthermore, as shown in FIG. 17, since the sentence with sentence ID=1 is the target information, "Y" indicating that the sentence with sentence ID=1 corresponds to the target information is attached to the determination model generating data.

In step S14, the determination model learning unit 92, using the determination model generating data shown in FIG. 17, learns a function that inputs the feature vector and determines either "Y" or "N", that is, whether or not the sentence is the "target information", in accordance with an arbitrary learning algorithm. In this way, in Exemplary embodiment 2, the determination model learning unit 92 learns a function that determines whether or not each sentence is the target information, taking into consideration both of the estimated density and the sentence content of each unit of training.

Thereafter, steps S15 to S19 are executed. Steps S15 to S19 are respectively identical to steps S1 to S5 of Exemplary embodiment 1 shown in FIG. 4. In Exemplary embodiment 2, a description of steps S15 to S19 has been omitted. When step S19 ends, the processing performed by the information analysis apparatus 9 ends.

In this way, according to Exemplary embodiment 2, the provision of the density estimation model learning unit 91 and the determination model learning unit 92 eliminates the need to manually create a density estimation model and a determination model, thus realizing the construction of a density estimation model and a determination model at a low cost. Furthermore, preparing a large volume of training text enhances the density estimation model and the determination model, thus enabling high-precision determination of a target information descriptive sentence without the need for experts to create various models. That is, although expertise and experience are necessary in order to create a density estimation model and descriptive determination model for determination of the target information, it is sufficient in Exemplary embodiment 2 to create information indicating whether or not each sentence is target information, which requires not so much expertise and experience. Therefore, according to Exemplary embodiment 2, it is possible to realize an apparatus for determining a target information descriptive sentence with high precision and at a low cost.

Figure 18:
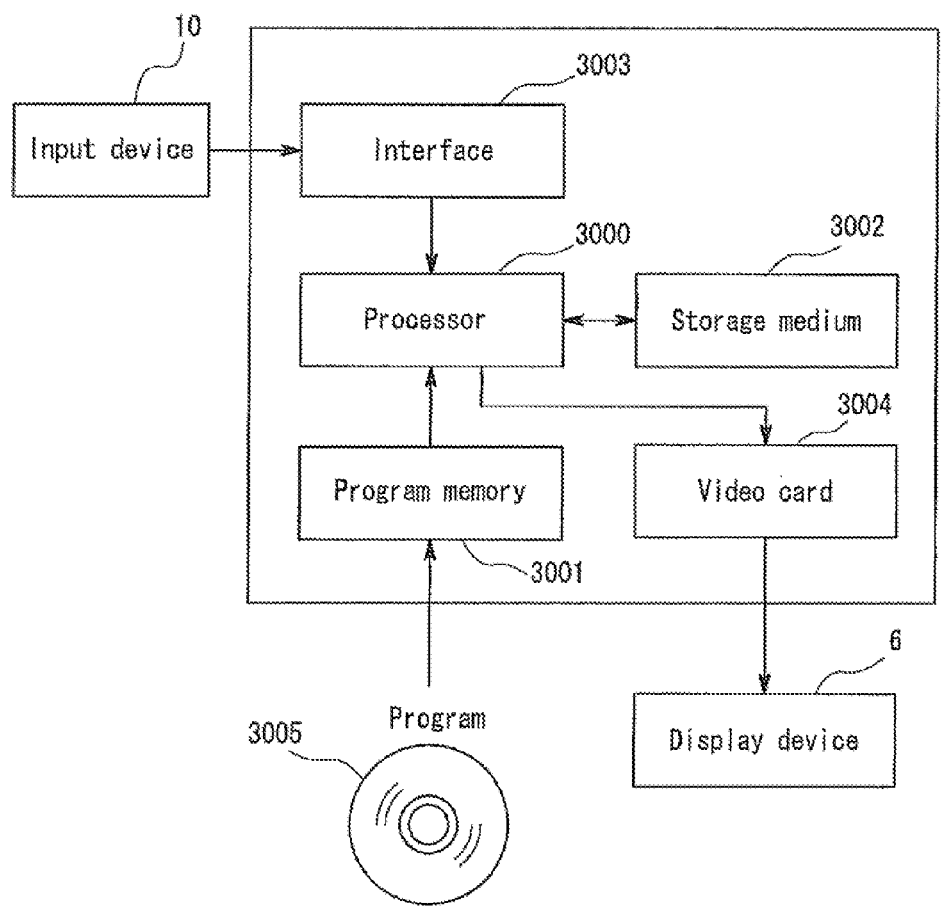
FIG. 18 is a block diagram showing a computer capable of executing programs according to Exemplary embodiments 1 and 2.

Although the above has been a description of the information analysis apparatuses and the information analysis methods according to Exemplary embodiments 1 and 2 of the present invention, the present invention may be realized as computer software. Here is a description of a program according to Exemplary embodiment 1 and a program according to Exemplary embodiment 2. FIG. 18 is a block diagram showing a computer capable of executing the programs according to Exemplary embodiments 1 and 2.

The computer shown in FIG. 18 serves as an information processing system that implements the information analysis apparatuses according to the present invention. As shown in FIG. 18, the computer (information processing system) includes a processor 3000, a program memory 3001, a storage medium 3002, an interface 3003 connected to external devices, and a video card 3004 used to output display data. Examples of the storage medium 3002 include various memories, such as a RAM, and a magnetic storage medium such as a hard disk.

The program memory 3001 stores programs that execute the processing steps performed by the information analysis apparatuses according to Exemplary embodiments 1 and 2, and the processor 3000 operates in accordance with the programs. That is, the program memory 3001 stores a program including instructions to execute steps S1 to S5 shown in FIG. 4, and the information analysis apparatus 5 according to Exemplary embodiment 1 is implemented by executing this program. In this case, the processor 3000 serves as the unit-of-analysis generation unit 50, the density estimation unit 51, and the determination unit 52, and the storage medium 3002 serves as the storage device 4.

The program memory 3001 also stores a program including instructions to execute steps S11 to S19 shown in FIG. 14, and the information analysis apparatus 9 according to Exemplary embodiment 2 is implemented by executing this program. In this case, the processor 3000 serves as the training data generation unit 90, the density estimation model learning unit 91, the determination model learning unit 92, the unit-of-analysis generation unit 50, the density estimation unit 51, and the determination unit 52, and the storage medium 3002 serves as the storage device 8.

Furthermore, the programs of Exemplary embodiments 1 and 2 stored in the program memory 3001 may be provided in a state of being recorded in a computer-readable recording medium 3005 as shown FIG. 18, or it may be provided via a network (not shown). Examples of such a computer-readable recording medium, include an optical disk, a magnetic disk, a magneto-optical disk, a semiconductor memory, and a floppy disk. Note that the computer-readable recording medium 3005 shown in FIG. 18 is an optical disk.

Although the present invention have been described with reference to Exemplary embodiments 1 and 2, the present invention is not intended to be limited to Exemplary embodiments 1 and 2 described above. It should be noted that various modifications that are understandable for those skilled in the art can be made to the configuration and details of the present invention within the scope of the present invention.

This application is the National Phase of PCT/JP2009/005175, filed Oct. 6, 2009, which is based upon and claims the benefit of priority from Japanese Patent Application No. 2008-263950 filed on Oct. 10, 2008, the disclosure of which is incorporated herein in its entirety by reference.

An information analysis apparatus, an information analysis method, and a computer-readable recording medium according to the present invention have the following characteristics.

(1) An information analysis apparatus for performing an analysis on text information to determine whether or not the text information corresponds to target information, including a density estimation unit that estimates, in units of analysis each composed of a plurality of sentences of the text information, a density indicating a degree to which each unit of analysis contains the target information, and a determination unit that obtains an evaluation value indicating a degree to which each sentence included in each unit of analysis corresponds to the target information from the estimated density of the unit of analysis, and determines whether or not the sentence is the target information based on the evaluation value.

(2) The information analysis apparatus described in (1) above, further including a unit-of-analysis generation unit that generates a plurality of the units of analysis from the text information, wherein the density estimation unit estimates the density for each unit of analysis generated by the unit-of-analysis generation unit.

(3) The information analysis apparatus described in (2) above, wherein the unit-of-analysis generation unit generates the plurality of units of analysis, such that a sentence included in each unit of analysis coincides with a sentence included in another unit of analysis.

(4) The information analysis apparatus described in (2) above, wherein the unit-of-analysis generation unit generates the plurality of units of analysis by, for each unit of analysis, extracting a preset number of consecutive sentences from a plurality of consecutive sentences of the text information and generating the unit of analysis from the extracted consecutive sentences.

(5) The information analysis apparatus described in (2) above, wherein the unit-of-analysis generation unit generates the plurality of units of analysis by, for each unit of analysis, extracting a preset number of consecutive sentences from a plurality of consecutive sentences of the text information and generating the unit of analysis from the extracted consecutive sentences, such that a sentence included in each unit of analysis coincides with a sentence included in another unit of analysis.

(6) The information analysis apparatus described in (2) above, wherein in a case where a plurality of sentences of the text information are numbered consecutively, the unit-of-analysis generation unit generates the plurality of units of analysis by, for each unit of analysis, extracting a preset number of consecutively numbered sentences, such that the number of a beginning or end sentence to be extracted shifts by a set number for each unit of analysis.

(7) The information analysis apparatus described in (6) above, wherein in a case where the text information includes N consecutive sentences numbered from 1 to N, and the plurality of units of analysis each include W sentences, the unit-of-analysis generation unit generates (N+W−1) units of analysis numbered from 1 to (N+W−1), in which case a 1st unit of analysis is generated from W 1st sentences, 2nd to (W−1)th units of analysis are each generated from the 1st sentence, a sentence whose number is smaller than the number of the unit of analysis, and a sentence whose number is the same as the number of the unit of analysis, Wth to Nth units of analysis are each generated by extracting W sentences numbered consecutively, while shifting the number of a beginning sentence by one such that the number of the last sentence is the same as the number of the unit of analysis, (N+1)th to (N+W−2)th units of analysis are each generated from a sentence whose number is smaller than N and an Nth sentence, and an (N+W−1)th unit of analysis is generated from W Nth sentences.

(8) The information analysis apparatus described in (1) above, wherein the density estimation unit outputs to the determination unit, in addition to the estimated density of each unit of analysis, one or more types of information as a feature quantity of the unit of analysis, the one or more types of information including information obtained from a word or a clause in each sentence of the unit of analysis and information acquired by comparing the text information and the sentence, and the determination unit performs the determination using the evaluation value and the one or more types of information.

(9) The information analysis apparatus described in (1) above, wherein the density estimation unit estimates the density using a feature quantity of each unit of analysis, where the feature quality is one or more types of information that include information obtained from a word or a clause in each sentence of the unit of analysis and information acquired by comparing the text information and the sentence.

(10) The information analysis apparatus described in (1) above, wherein the determination unit obtains, for each sentence included in a plurality of units of analysis, at least one of a sum of densities of the units of analysis including the sentence, an average of the densities and a standard deviation of the densities, calculates the evaluation value of the sentence using the obtained value, and if the evaluation value exceeds a predetermined threshold value, determines the sentence as corresponding to the target information.

(11) The information analysis apparatus described in (1) above, further including a training data generation unit that generates training data from training text information, and a density estimation model learning unit, wherein the training text information includes information indicating whether or not each sentence of the training text information is the target information, and has generated therein a plurality of units of training each composed of a plurality of sentences of the training text information, the training data generation unit sets, for each unit of training, a target information density indicating a degree to which the unit of training contains the target information, with reference to information indicating whether or not each sentence of the unit of training is the target information, further obtains, for each unit of training, a feature quantity from information acquired from a word or a clause in each sentence of the unit of training, and generates the target information density and the feature quantity of each unit of training as the training data, the density estimation model learning unit learns a density estimation model usable in the density estimation performed by the density estimation unit, using the generated training data, and the density estimation unit estimates the density for each unit of analysis in accordance with the density estimation model learned by the density estimation model learning unit.

(12) The information analysis apparatus described in (2) above, further including a training data generation unit that generates training data from training text information, and a density estimation model learning unit, wherein the training text information includes information indicating whether or not each sentence of the training text information is the target information, the training data generation unit generates a plurality of units of training each composed of a plurality of sentences of the training text information, from the training text information in accordance with a setting condition, sets, for each unit of training, a target information density indicating an amount of the target information included in the unit of training, with reference to information indicating whether or not each sentence of the unit of training is the target information, further obtains, for each unit of training, a feature quantity from information acquired from a word or a clause in each sentence of the unit of training, and generates the target information density and the feature quantity of each unit of training as the training data, the density estimation model learning unit learns a density estimation model usable in the density estimation performed by the density estimation unit, using the generated training data, and the density estimation unit estimates the density for each unit of analysis in accordance with the density estimation model learned by the density estimation model learning unit.

(13) The information analysis apparatus described in (12) above, wherein the training data generation unit generates the plurality of units of training, such that a sentence included in each unit of training coincides with a sentence included in another unit of training, and further obtains, for each unit of training, a feature quantity from one or more types of information that include information acquired from a word or a clause in each sentence of the unit of training and information acquired by comparing the training text information and each sentence of the unit of training.

(14) The information analysis apparatus described in (12) above, wherein the training data generation unit generates the plurality of units of training by, for each unit of training, extracting a preset number of consecutive sentences from a plurality of consecutive sentences of the training text information and generating the unit of training from the extracted consecutive sentences, and further obtains, for each unit of training, a feature quantity from one or more types of information that include information acquired from a word or a clause in each sentence of the unit of training and information acquired by comparing the training text information and each sentence of the unit of training.

(15) The information analysis apparatus described in (12) above, wherein the training data generation unit generates the plurality of units of training by, for each unit of training, extracting a preset number of consecutive sentences from a plurality of consecutive sentences of the training text information and generating the unit of training from the extracted consecutive sentences, such that a sentence included in each unit of training coincides with a sentence included in another unit of training, and further obtains, for each unit of training, a feature quantity from one or more types of information that include information acquired from a word or a clause in each sentence of the unit of training and information acquired by comparing the training text information and each sentence of the unit of training.

(16) The information analysis apparatus described in (12) above, wherein in a case where a plurality of sentences of the training text information are numbered consecutively, the training data generation unit generates the plurality of units of training by, for each unit of training, extracting a preset number of consecutively numbered sentences, such that the number of a beginning or end sentence to be extracted shifts by a set number for each unit of training, and further obtains, for each unit of training, a feature quantity from one or more types of information that include information acquired from a word or a clause in each sentence of the unit of training and information acquired by comparing the training text information and each sentence of the unit of training.

(17) The information analysis apparatus described in (12) above, further including a determination model learning unit, wherein the density estimation model learning unit further estimates, for each unit of training, a density indicating a degree to which the unit of training contains the target information, the determination model learning unit generates feature data from the density estimated by the density estimation model learning unit and the training data, and further learns a determination model usable in the determination performed by the determination unit, using the feature data, and the determination unit determines whether or not each sentence is target information in accordance with the learned determination model.

(18) The information analysis apparatus described in (17) above, wherein the density estimation model learning unit further estimates, for each unit of training, a density indicating a degree to which the unit of training contains the target information, using the learned density estimation model.

(19) The information analysis apparatus described in (17) above, wherein the determination model learning unit obtains, for each sentence included in a plurality of units of training, at least one of a sum, an average and a dispersion of the densities of the units of training including the sentence, and generates the feature data using the obtained value and one or more types of information that include information acquired from a word or a clause in each sentence of the units of training and information acquired by comparing the training text information and each sentence of the units of training.

(20) The information analysis apparatus described in (12) above, wherein the unit-of-analysis generation unit generates the plurality of units of analysis in accordance with the same condition as the setting condition in accordance with which the training data generation unit generates the units of training.

(21) An information analysis method for performing an analysis on text information to determine whether or not the text information corresponds to target information, including the steps of (a) estimating, in units of analysis each composed of a plurality of sentences of the text information, a density indicating a degree to which each unit of analysis contains the target information, and (b) obtaining an evaluation value indicating a degree to which each sentence included in each unit of analysis corresponds to the target information from the estimated density of the unit of analysis, and determining whether or not the sentence is the target information based on the evaluation value.

(22) The information analysis method described in (21) above, further including the step of (c) generating a plurality of the units of analysis from the text information, wherein in the step (b), the density is estimated for each unit of analysis generated in the step (c).

(23) The information analysis method described in (22) above, wherein in the step (c), the plurality of units of analysis are generated, such that a sentence included in each unit of analysis coincides with a sentence included in another unit of analysis.

(24) The information analysis method described in (22) above, wherein in the step (c), the plurality of units of analysis are generated by, for each unit of analysis, extracting a preset number of consecutive sentences from a plurality of consecutive sentences of the text information and generating the unit of analysis from the extracted consecutive sentences.

(25) The information analysis method described in (22) above, wherein in the step (c), the plurality of units of analysis are generated by, for each unit of analysis, extracting a preset number of consecutive sentences from a plurality of consecutive sentences of the text information and generating the unit of analysis from the extracted consecutive sentences, such that a sentence included in each unit of analysis coincides with a sentence included in another unit of analysis.

(26) The information analysis method described in (22) above, wherein in a case where a plurality of sentences of the text information are numbered consecutively, the plurality of units of analysis are generated in the step (c) by, for each unit of analysis, extracting a preset number of consecutively numbered sentences, such that the number of a beginning or end sentence to be extracted shifts by a set number for each unit of analysis.

(27) The information analysis method described in (26) above, wherein in a case where the text information includes N consecutive sentences numbered from 1 to N, and the plurality of units of analysis each include W sentences, (N+W−1) units of analysis numbered from 1 to (N+W−1) are generated in the step (c), in which case a 1st unit of analysis is generated from W 1st sentences, 2nd to (W−1)th units of analysis are each generated from the 1st sentence, a sentence whose number is smaller than the number of the unit of analysis, and a sentence whose number is the same as the number of the unit of analysis, Wth to Nth units of analysis are each generated by extracting W sentences numbered consecutively, while shifting the number of a beginning sentence by one such that the number of the last sentence is the same as the number of the unit of analysis, (N+1)th to (N+W−2)th units of analysis are each generated from a sentence whose number is smaller than N and an Nth sentence, and an (N+W−1)th unit of analysis is generated from W Nth sentences.

(28) The information analysis method described in (21) above, wherein in the step (a), in addition to the estimated density of each unit of analysis, one or more types of information are obtained as a feature quantity of the unit of analysis, the one or more types of information including information obtained from a word or a clause in each sentence of the unit of analysis and information acquired by comparing the text information and the sentence, and in the step (b), the determination is performed using the evaluation value and the one or more types of information.

(29) The information analysis method described in (21) above, wherein in the step (a), the density is estimated using a feature quantity of each unit of analysis, where the feature quantity is one or more types of information that include information obtained from a word or a clause in each sentence of the unit of analysis and information acquired by comparing the text information and the sentence.

(30) The information analysis method described in (21) above, wherein in the step (b), for each sentence included in a plurality of units of analysis, at least one of a sum of densities of the units of analysis including the sentence, an average of the densities and a standard deviation of the densities is obtained, the evaluation value of the sentence is calculated using the obtained value, and if the evaluation value exceeds a predetermined threshold value, the sentence is determined as corresponding to the target information.

(31) The information analysis method described in (21) above, further including the steps of (d) generating training data from training text information including information indicating whether or not each sentence of the training text information is the target information and having generated therein a plurality of units of training each composed of a plurality of sentences of the training text information, by setting, for each unit of training, a target information density indicating a degree to which the unit of training contains the target information, with reference to information indicating whether or not each sentence of the unit of training is the target information, further obtaining, for each unit of training, a feature quantity from information acquired from a word or a clause in each sentence of the unit of training, and generating the target information density and the feature quantity of each unit of training as the training data, and (e) learning a density estimation model usable in the density estimation performed in the step (a), using the training data generated in the step (d), wherein in the step (a), for each unit of analysis, the density is estimated in accordance with the density estimation model acquired in the step (e).

(32) The information analysis method described in (22) above, further including the steps of (d) generating training data from training text information including information indicating whether or not each sentence of the training text information is the target information, by generating a plurality of units of training each composed of a plurality of sentences of the training text information, from the training text information in accordance with a setting condition, setting, for each unit of training, a target information density indicating an amount of the target information included in the unit of training, with reference to information indicating whether or not each sentence of the unit of training is the target information, further obtaining, for each unit of training, a feature quantity from information acquired from a word or a clause in each sentence of the unit of training, and generating the target information density and the feature quantity of each unit of training as the training data, and (e) learning a density estimation model usable in the density estimation performed in the step (a), using the training data generated in the step (d), wherein in the step (a), for each unit of analysis, the density is estimated in accordance with the density estimation model acquired in the step (e).

(33) The information analysis method described in (32) above, wherein in the step (d), the plurality of units of training are generated, such that a sentence included in each unit of training coincides with a sentence included in another unit of training, and a feature quantity is further obtained for each unit of training from one or more types of information that include information acquired from a word or a clause in each sentence of the unit of training and information acquired by comparing the training text information and each sentence of the unit of training.

(34) The information analysis method described in (32) above, wherein in the step (d), the plurality of units of training are generated by, for each unit of training, extracting a preset number of consecutive sentences from a plurality of consecutive sentences of the training text information and generating the unit of training from the extracted consecutive sentences, and a feature quantity is further obtained for each unit of training from one or more types of information that include information acquired from a word or a clause in each sentence of the unit of training and information acquired by comparing the training text information and each sentence of the unit of training.

(35) The information analysis method described in (32) above, wherein in the step (d), the plurality of units of training are generated by, for each unit of training, extracting a preset number of consecutive sentences from a plurality of consecutive sentences of the training text information and generating the unit of training from the extracted consecutive sentences, such that a sentence included in the unit of training coincides with a sentence included in another unit of training, and a feature quantity is further obtained for each unit of training from one or more types of information that include information acquired from a word or a clause in each sentence of the unit of training and information acquired by comparing the training text information and each sentence of the unit of training.

(36) The information analysis method described in (32) above, wherein in a case where a plurality of sentences of the training text information are numbered consecutively, in the step (d), the plurality of units of training are generated by, for each unit of training, extracting a preset number of consecutively numbered sentences, such that the number of a beginning or end sentence to be extracted shifts by a set number for each unit of training, and a feature quantity is further obtained for each unit of training from one or more types of information that include information acquired from a word or a clause in each sentence of the unit of training and information acquired by comparing the training text information and each sentence of the unit of training.

(37) The information analysis method described in (32) above, further including the steps of (f) estimating, for each unit of training, a density indicating a degree to which the unit of training contains the target information, and (g) generating feature data from the density estimated in the step (f) and the training data, and further acquiring a determination model usable in the determination performed in the step (b), using the feature data, wherein in the step (b), it is determined whether or not each sentence is target information in accordance with the determination model acquired in the step (g).

(38) The information analysis method described in (37) above, wherein in the step (f), for each unit of training, a density indicating a degree to which the unit of training contains the target information is estimated using the density estimation model acquired in the step (e).

(39) The information analysis method described in (37) above, wherein in the step (g), for each sentence included in a plurality of units of training, at least one of a sum, an average and a dispersion of the densities of the units of training including the sentence is obtained, and the feature data is generated using the obtained value and one or more types of information that include information acquired from a word or a clause in each sentence of the units of training and information acquired by comparing the training text information and each sentence of the units of training.

(40) The information analysis method described in (32) above, wherein in the step (c), the plurality of units of analysis are generated in accordance with the same condition as the setting condition in accordance with which the units of training are generated in the step (d).

(41) A computer-readable recording medium that records a program for causing a computer to perform an analysis on text information to determine whether or not the text information corresponds to target information, the program including instructions to cause the computer to execute the steps of (a) estimating, in units of analysis each composed of a plurality of sentences of the text information, a density indicating a degree to which the unit of analysis contains the target information, and (b) obtaining an evaluation value indicating a degree to which each sentence included in each unit of analysis corresponds to the target information from the estimated density of the unit of analysis, and determining whether or not the sentence is the target information based on the evaluation value.

(42) The computer-readable recording medium described in (41) above, wherein the computer is further caused to execute the step of (c) generating a plurality of the units of analysis from the text information, wherein in the step (b), the density is estimated for each unit of analysis generated in the step (c).

(43) The computer-readable recording medium described in (42) above, wherein in the step (c), the plurality of units of analysis are generated, such that a sentence included in each unit of analysis coincides with a sentence included in another unit of analysis.

(44) The computer-readable recording medium described in (42) above, wherein in the step (c), the plurality of units of analysis are generated by, for each unit of analysis, extracting a preset number of consecutive sentences from a plurality of consecutive sentences of the text information and generating the unit of analysis from the extracted consecutive sentences.

(45) The computer-readable recording medium described in (42) above, wherein in the step (c), the plurality of units of analysis are generated by, for each unit of analysis, extracting a preset number of consecutive sentences from a plurality of consecutive sentences of the text information and generating the unit of analysis from the extracted consecutive sentences, such that a sentence included in each unit of analysis coincides with a sentence included in another unit of analysis.

(46) The computer-readable recording medium described in (42) above, wherein in a case where a plurality of sentences of the text information are numbered consecutively, the plurality of units of analysis are generated in the step (c) by, for each unit of analysis, extracting a preset number of consecutively numbered sentences, such that the number of a beginning or end sentence to be extracted shifts by a set number for each unit of analysis.

(47) The computer-readable recording medium described in (46) above, wherein in a case where the text information includes N consecutive sentences numbered from 1 to N, and the plurality of units of analysis each include W sentences, (N+W−1) units of analysis numbered from 1 to (N+W−1) are generated in the step (c), in which case a 1st unit of analysis is generated from W 1st sentences, 2nd to (W−1)th units of analysis are each generated from the 1st sentence, a sentence whose number is smaller than the number of the unit of analysis, and a sentence whose number is the same as the number of the unit of analysis, Wth to Nth units of analysis are each generated by extracting W sentences numbered consecutively, while shifting the number of a beginning sentence by one such that the number of the last sentence is the same as the number of the unit of analysis, (N+1)th to (N+W−2)th units of analysis are each generated from a sentence whose number is smaller than N and an Nth sentence, and an (N+W−1)th unit of analysis is generated from W Nth sentences.

(48) The computer-readable recording medium described in (41) above, wherein in the step (a), in addition to the estimated density of each unit of analysis, one or more types of information are obtained as a feature quantity of the unit of analysis, the one or more types of information including information obtained from a word or a clause in each sentence of the unit of analysis and information acquired by comparing the text information and the sentence, and in the step (b), the determination is performed using the evaluation value and the one or more

(49) The computer-readable recording medium described in (41) above, wherein in the step (a), the density is estimated using a feature quantity of each unit of analysis, where the feature quantity is one or more types of information that include information obtained from a word or a clause in each sentence of the unit of analysis and information acquired by comparing the text information and the sentence.

(50) The computer-readable recording medium described in (41) above, wherein in the step (b), for each sentence included in a plurality of units of analysis, at least one of a sum of densities of the units of analysis including the sentence, an average of the densities and a standard deviation of the densities is obtained, the evaluation value of the sentence is calculated using the obtained value, and if the evaluation value exceeds a predetermined threshold value, the sentence is determined as corresponding to the target information.

(51) The computer-readable recording medium described in (41) above, wherein the computer is further caused to execute the steps of (d) generating training data from training text information including information indicating whether or not each sentence of the training text information is the target information and having generated therein a plurality of units of training each composed of a plurality of sentences of the training text information, by setting, for each unit of training, a target information density indicating a degree to which the unit of training contains the target information, with reference to information indicating whether or not each sentence of the unit of training is the target information, further obtaining, for each unit of training, a feature quantity from information acquired from a word or a clause in each sentence of the unit of training, and generating the target information density and the feature quantity of each unit of training as the training data, and (e) learning a density estimation model usable in the density estimation performed in the step (a), using the training data generated in the step (d), wherein in the step (a), for each unit of analysis, the density is estimated in accordance with the density estimation model acquired in the step (e).

(52) The computer-readable recording medium described in (42) above, wherein the computer is further caused to execute the steps of (d) generating training data from training text information including information indicating whether or not each sentence of the training text information is the target information, by generating a plurality of units of training each composed of a plurality of sentences of the training text information, from the training text information in accordance with a setting condition, setting, for each unit of training, a target information density indicating an amount of the target information included in the unit of training, with reference to information indicating whether or not each sentence of the unit of training is the target information, further obtaining, for each unit of training, a feature quantity from information acquired from a word or a clause in each sentence of the unit of training, and generating the target information density and the feature quantity of each unit of training as the training data, and (e) learning a density estimation model usable in the density estimation performed in the step (a), using the training data generated in the step (d), wherein in the step (a), for each unit of analysis, the density is estimated in accordance with the density estimation model acquired in the step (e).

(53) The computer-readable recording medium described in (52) above, wherein in the step (d), the plurality of units of training are generated, such that a sentence included in each unit of training coincides with a sentence included in another unit of training and a feature quantity is further obtained for each unit of training from one or more types of information that include information acquired from a word or a clause in each sentence of the unit of training and information acquired by comparing the training text information and each sentence of the unit of training.

(54) The computer-readable recording medium described in (52) above, wherein in the step (d), the plurality of units of training are generated by, for each unit of training, extracting a preset number of consecutive sentences from a plurality of consecutive sentences of the training text information and generating the unit of training from the extracted consecutive sentences, and a feature quantity is further obtained for each unit of training from one or more types of information that include information acquired from a word or a clause in each sentence of the unit of training and information acquired by comparing the training text information and each sentence of the unit of training.

(55) The computer-readable recording medium described in (52) above, wherein in the step (d), the plurality of units of training are generated by, for each unit of training, extracting a preset number of consecutive sentences from a plurality of consecutive sentences of the training text information and generating the unit of training from the extracted consecutive sentences, such that a sentence included in the unit of training coincides with a sentence included in another unit of training, and a feature quantity is further obtained for each unit of training from one or more types of information that include information acquired from a word or a clause in each sentence of the unit of training and information acquired by comparing the training text information and each sentence of the unit of training.

(56) The computer-readable recording medium described in (52) above, wherein in a case where a plurality of sentences of the training text information are numbered consecutively, in the step (d), the plurality of units of training are generated by, for each unit of training, extracting a preset number of consecutively numbered sentences, such that the number of a beginning or end sentence to be extracted shifts by a set number for each unit of training, and a feature quantity is further obtained for each unit of training from one or more types of information that include information acquired from a word or a clause in each sentence of the unit of training and information acquired by comparing the training text information and each sentence of the unit of training.

(57) The computer-readable recording medium described in (52) above, wherein the computer is further caused to execute the steps of (f) estimating, for each unit of training, a density indicating a degree to which the unit of training contains the target information, and (g) generating feature data from the density estimated in the step (f) and the training data, and further acquiring a determination model usable in the determination performed in the step (b), using the feature data, wherein in the step (b), it is determined whether or not each sentence is target information in accordance with the determination model acquired in the step (g).

(58) The computer-readable recording medium described in (57) above, wherein in the step (f), for each unit of training, a density indicating a degree to which the unit of training contains the target information is estimated using the density estimation model acquired in the step (e).

(59) The computer-readable recording medium described in (57) above, wherein in the step (g), for each sentence included in a plurality of units of training, at least one of a sum, an average and a dispersion of the densities of the units of training including the sentence is obtained, and the feature data is generated using the obtained value and one or more types of information that include information acquired from a word or a clause in each sentence of the units of training and information acquired by comparing the training text information and each sentence of the units of training.

(60) The computer-readable recording medium described in (52) above, wherein in the step (c), the plurality of units of analysis are generated in accordance with the same condition as the setting condition in accordance with which the units of training are generated in the step (d).

INDUSTRIAL APPLICABILITY

As described above, according to the present invention, it is possible to determine, in units of single sentences, rather than in units of plural sentences, whether or not the sentence is target information, while taking into consideration a tendency of appearance of the target information. Accordingly, the present invention is usable as an information extraction apparatus for extracting specific information from text, or usable as a data collection unit of a specialized retrieval device for carrying out retrieval after narrowing down to only specific information.

DESCRIPTIONS OF REFERENCE NUMERALS

1 Input unit
4 Storage device
5 Information analysis apparatus (Exemplary embodiment 1)
6 Display device
7 Training text input unit
8 Storage device
9 Information analysis apparatus (Exemplary embodiment 2)
10 Input device
40 Input text storage unit
41 Density estimation model storage unit
42 Determination model storage unit
50 Unit-of-analysis generation unit
51 Density estimation unit
52 Determination unit
80 Training text storage unit
90, Training data generation unit
91 Density estimation model learning unit
92 Determination model learning unit
3000 Processor
3001 Program memory system
3002 Storage medium
3003 Interface
3004 Video card
3005 Computer-readable recording medium

The invention claimed is:

1. An information analysis apparatus for performing an analysis on text information to determine whether or not the text information corresponds to target information, comprising:
a storage device that stores the text information;
a density estimation unit that estimates, in units of analysis each composed of a plurality of sentences of the text information, a density indicating a degree to which each unit of analysis contains the target information; and
a determination unit that obtains an evaluation value indicating a degree to which each sentence included in each unit of analysis corresponds to the target information from the estimated density of the unit of analysis, and determines whether or not the sentence is the target information based on the evaluation value.

2. The information analysis apparatus according to claim 1, further comprising:
a unit-of-analysis generation unit that generates a plurality of the units of analysis from the text information,
wherein the density estimation unit estimates the density for each unit of analysis generated by the unit-of-analysis generation unit.

3. The information analysis apparatus according to claim 2, wherein the unit-of-analysis generation unit generates the plurality of units of analysis, such that a sentence included in each unit of analysis coincides with a sentence included in another unit of analysis.

4. The information analysis apparatus according to claim 2, wherein the unit-of-analysis generation unit generates the plurality of units of analysis by, for each unit of analysis, extracting a preset number of consecutive sentences from a plurality of consecutive sentences of the text information and generating the unit of analysis from the extracted consecutive sentences.

5. The information analysis apparatus according to claim 2, wherein the unit-of-analysis generation unit generates the plurality of units of analysis by, for each unit of analysis, extracting a preset number of consecutive sentences from a plurality of consecutive sentences of the text information and generating the unit of analysis from the extracted consecutive sentences, such that a sentence included in each unit of analysis coincides with a sentence included in another unit of analysis.

6. The information analysis apparatus according to claim 2, wherein in a case where a plurality of sentences of the text information are numbered consecutively, the unit-of-analysis generation unit generates the plurality of units of analysis by, for each unit of analysis, extracting a preset number of consecutively numbered sentences, such that the number of a beginning or end sentence to be extracted shifts by a set number for each unit of analysis.

7. The information analysis apparatus according to claim 6, wherein in a case where the text information includes N consecutive sentences numbered from 1 to N, and the plurality of units of analysis each include W sentences, the unit-of-analysis generation unit generates (N+W−1) units of analysis numbered from 1 to (N+W−1), in which case
a 1st unit of analysis is generated from W 1st sentences,
2nd to (W−1)th units of analysis are each generated from the 1st sentence, a sentence whose number is smaller than the number of the unit of analysis, and a sentence whose number is the same as the number of the unit of analysis,
Wth to Nth units of analysis are each generated by extracting W sentences numbered consecutively, while shifting the number of a beginning sentence by one such that the number of the last sentence is the same as the number of the unit of analysis,
(N+1)th to (N+W−2)th units of analysis are each generated from a sentence whose number is smaller than N and an Nth sentence, and
an (N+W−1)th unit of analysis is generated from W Nth sentences.

8. The information analysis apparatus according to claim 1, wherein
the density estimation unit outputs to the determination unit, in addition to the estimated density of each unit of analysis, one or more types of information as a feature quantity of the unit of analysis, the one or more types of information including information obtained from a word or a clause in each sentence of the unit of analysis and information acquired by comparing the text information and the sentence, and the determination unit performs the determination using the evaluation value and the one or more types of information.

9. The information analysis apparatus according to claim 1, wherein the density estimation unit estimates the density using a feature quantity of each unit of analysis, where the feature quality is one or more types of information that include information obtained from a word or a clause in each sentence of the unit of analysis and information acquired by comparing the text information and the sentence.

10. The information analysis apparatus according to claim 1, wherein the determination unit obtains, for each sentence included in a plurality of units of analysis, at least one of a sum of densities of the units of analysis including the sentence, an average of the densities and a standard deviation of the densities, calculates the evaluation value of the sentence using the obtained value, and if the evaluation value exceeds a predetermined threshold value, determines the sentence as corresponding to the target information.

11. The information analysis apparatus according to claim 1, further comprising:
a training data generation unit that generates training data from training text information; and
a density estimation model learning unit,
wherein the training text information includes information indicating whether or not each sentence of the training text information is the target information, and has generated therein a plurality of units of training each composed of a plurality of sentences of the training text information,
the training data generation unit sets, for each unit of training, a target information density indicating a degree to which the unit of training contains the target information, with reference to information indicating whether or not each sentence of the unit of training is the target information, further obtains, for each unit of training, a feature quantity from information acquired from a word or a clause in each sentence of the unit of training, and generates the target information density and the feature quantity of each unit of training as the training data,
the density estimation model learning unit learns a density estimation model usable in the density estimation performed by the density estimation unit, using the generated training data, and
the density estimation unit estimates the density for each unit of analysis in accordance with the density estimation model learned by the density estimation model learning unit.

12. The information analysis apparatus according to claim 2, further comprising:
a training data generation unit that generates training data from training text information; and
a density estimation model learning unit,
wherein the training text information includes information indicating whether or not each sentence of the training text information is the target information,
the training data generation unit generates a plurality of units of training each composed of a plurality of sentences of the training text information, from the training text information in accordance with a setting condition, sets, for each unit of training, a target information density indicating an amount of the target information included in the unit of training, with reference to information indicating whether or not each sentence of the unit of training is the target information, further obtains, for each unit of training, a feature quantity from information acquired from a word or a clause in each sentence of the unit of training, and generates the target information density and the feature quantity of each unit of training as the training data,
the density estimation model learning unit learns a density estimation model usable in the density estimation performed by the density estimation unit, using the generated training data, and
the density estimation unit estimates the density for each unit of analysis in accordance with the density estimation model learned by the density estimation model learning unit.

13. The information analysis apparatus according to claim 12, wherein the training data generation unit generates the plurality of units of training, such that a sentence included in each unit of training coincides with a sentence included in another unit of training, and further obtains, for each unit of training, a feature quantity from one or more types of information that include information acquired from a word or a clause in each sentence of the unit of training and information acquired by comparing the training text information and each sentence of the unit of training.

14. The information analysis apparatus according to claim 12, wherein the training data generation unit generates the plurality of units of training by, for each unit of training, extracting a preset number of consecutive sentences from a plurality of consecutive sentences of the training text information and generating the unit of training from the extracted consecutive sentences, and further obtains, for each unit of training, a feature quantity from one or more types of information that include information acquired from a word or a clause in each sentence of the unit of training and information acquired by comparing the training text information and each sentence of the unit of training.

15. The information analysis apparatus according to claim 12, wherein the training data generation unit generates the plurality of units of training by, for each unit of training, extracting a preset number of consecutive sentences from a plurality of consecutive sentences of the training text information and generating the unit of training from the extracted consecutive sentences, such that a sentence included in each unit of training coincides with a sentence included in another unit of training, and further obtains, for each unit of training, a feature quantity from one or more types of information that include information acquired from a word or a clause in each sentence of the unit of training and information acquired by comparing the training text information and each sentence of the unit of training.

16. The information analysis apparatus according to claim 12, wherein in a case where a plurality of sentences of the training text information are numbered consecutively, the training data generation unit generates the plurality of units of training by, for each unit of training, extracting a preset number of consecutively numbered sentences, such that the number of a beginning or end sentence to be extracted shifts by a set number for each unit of training, and further obtains, for each unit of training, a feature quantity from one or more types of information that include information acquired from a word or a clause in each sentence of the unit of training and information acquired by comparing the training text information and each sentence of the unit of training.

17. The information analysis apparatus according to claim 12, further comprising:

a determination model learning unit,
wherein the density estimation model learning unit further estimates, for each unit of training, a density indicating a degree to which the unit of training contains the target information, the determination model learning unit generates feature data from the density estimated by the density estimation model learning unit and the training data, and further learns a determination model usable in the determination performed by the determination unit, using the feature data, and the determination unit determines whether or not each sentence is target information in accordance with the learned determination model.

18. The information analysis apparatus according to claim 17, wherein the density estimation model learning unit further estimates, for each unit of training, a density indicating a degree to which the unit of training contains the target information, using the learned density estimation model.

19. The information analysis apparatus according to claim 17, wherein the determination model learning unit obtains, for each sentence included in a plurality of units of training, at least one of a sum, an average and a dispersion of the densities of the units of training including the sentence, and generates the feature data using the obtained value and one or more types of information that include information acquired from a word or a clause in each sentence of the units of training and information acquired by comparing the training text information and each sentence of the units of training.

20. The information analysis apparatus according to claim 12, wherein the unit-of-analysis generation unit generates the plurality of units of analysis in accordance with the same condition as the setting condition in accordance with which the training data generation unit generates the units of training.

21. An information analysis method for performing an analysis on text information to determine whether or not the text information corresponds to target information, comprising the steps of:
(a) estimating, in units of analysis each composed of a plurality of sentences of the text information, a density indicating a degree to which each unit of analysis contains the target information; and
(b) obtaining an evaluation value indicating a degree to which each sentence included in each unit of analysis corresponds to the target information from the estimated density of the unit of analysis, and determining whether or not the sentence is the target information based on the evaluation value.

22. The information analysis method according to claim 21, further comprising the step of:
(c) generating a plurality of the units of analysis from the text information,
wherein in the step (b), the density is estimated for each unit of analysis generated in the step (c).

23. The information analysis method according to claim 22, wherein in the step (c), the plurality of units of analysis are generated, such that a sentence included in each unit of analysis coincides with a sentence included in another unit of analysis.

24. The information analysis method according to claim 22, wherein in the step (c), the plurality of units of analysis are generated by, for each unit of analysis, extracting a preset number of consecutive sentences from a plurality of consecutive sentences of the text information and generating the unit of analysis from the extracted consecutive sentences.

25. The information analysis method according to claim 22, wherein in the step (c), the plurality of units of analysis are generated by, for each unit of analysis, extracting a preset number of consecutive sentences from a plurality of consecutive sentences of the text information and generating the unit of analysis from the extracted consecutive sentences, such that a sentence included in each unit of analysis coincides with a sentence included in another unit of analysis.

26. The information analysis method according to claim 22, wherein in a case where a plurality of sentences of the text information are numbered consecutively, the plurality of units of analysis are generated in the step (c) by, for each unit of analysis, extracting a preset number of consecutively numbered sentences, such that the number of a beginning or end sentence to be extracted shifts by a set number for each unit of analysis.

27. The information analysis method according to claim 26, wherein in a case where the text information includes N consecutive sentences numbered from 1 to N, and the plurality of units of analysis each include W sentences, (N+W−1) units of analysis numbered from 1 to (N+W−1) are generated in the step (c), in which case
a 1st unit of analysis is generated from W 1st sentences,
2nd to (W−1)th units of analysis are each generated from the 1st sentence, a sentence whose number is smaller than the number of the unit of analysis, and a sentence whose number is the same as the number of the unit of analysis,
Wth to Nth units of analysis are each generated by extracting W sentences numbered consecutively, while shifting the number of a beginning sentence by one such that the number of the last sentence is the same as the number of the unit of analysis,
(N+1)th to (N+W−2)th units of analysis are each generated from a sentence whose number is smaller than N and an Nth sentence, and
an (N+W−1)th unit of analysis is generated from W Nth sentences.

28. The information analysis method according to claim 21, wherein
in the step (a), in addition to the estimated density of each unit of analysis, one or more types of information are obtained as a feature quantity of the unit of analysis, the one or more types of information including information obtained from a word or a clause in each sentence of the unit of analysis and information acquired by comparing the text information and the sentence, and
in the step (b), the determination is performed using the evaluation value and the one or more types of information.

29. The information analysis method according to claim 21, wherein in the step (a), the density is estimated using a feature quantity of each unit of analysis, where the feature quantity is one or more types of information that include information obtained from a word or a clause in each sentence of the unit of analysis and information acquired by comparing the text information and the sentence.

30. The information analysis method according to claim 21, wherein in the step (b), for each sentence included in a plurality of units of analysis, at least one of a sum of densities of the units of analysis including the sentence, an average of the densities and a standard deviation of the densities is obtained, the evaluation value of the sentence is calculated using the obtained value, and if the evaluation value exceeds a predetermined threshold value, the sentence is determined as corresponding to the target information.

31. The information analysis method according to claim 21, further comprising the steps of:
- (d) generating training data from training text information including information indicating whether or not each sentence of the training text information is the target information and having generated therein a plurality of units of training each composed of a plurality of sentences of the training text information, by setting, for each unit of training, a target information density indicating a degree to which the unit of training contains the target information, with reference to information indicating whether or not each sentence of the unit of training is the target information, further obtaining, for each unit of training, a feature quantity from information acquired from a word or a clause in each sentence of the unit of training, and generating the target information density and the feature quantity of each unit of training as the training data; and
- (e) learning a density estimation model usable in the density estimation performed in the step (a), using the training data generated in the step (d),
- wherein in the step (a), for each unit of analysis, the density is estimated in accordance with the density estimation model acquired in the step (e).

32. The information analysis method according to claim 22, further comprising the steps of:
- (d) generating training data from training text information including information indicating whether or not each sentence of the training text information is the target information, by generating a plurality of units of training each composed of a plurality of sentences of the training text information, from the training text information in accordance with a setting condition, setting, for each unit of training, a target information density indicating an amount of the target information included in the unit of training, with reference to information indicating whether or not each sentence of the unit of training is the target information, further obtaining, for each unit of training, a feature quantity from information acquired from a word or a clause in each sentence of the unit of training, and generating the target information density and the feature quantity of each unit of training as the training data; and
- (e) learning a density estimation model usable in the density estimation performed in the step (a), using the training data generated in the step (d),
- wherein in the step (a), for each unit of analysis, the density is estimated in accordance with the density estimation model acquired in the step (e).

33. The information analysis method according to claim 32, wherein in the step (d), the plurality of units of training are generated, such that a sentence included in each unit of training coincides with a sentence included in another unit of training, and a feature quantity is further obtained for each unit of training from one or more types of information that include information acquired from a word or a clause in each sentence of the unit of training and information acquired by comparing the training text information and each sentence of the unit of training.

34. The information analysis method according to claim 32, wherein in the step (d), the plurality of units of training are generated by, for each unit of training, extracting a preset number of consecutive sentences from a plurality of consecutive sentences of the training text information and generating the unit of training from the extracted consecutive sentences, and a feature quantity is further obtained for each unit of training from one or more types of information that include information acquired from a word or a clause in each sentence of the unit of training and information acquired by comparing the training text information and each sentence of the unit of training.

35. The information analysis method according to claim 32, wherein in the step (d), the plurality of units of training are generated by, for each unit of training, extracting a preset number of consecutive sentences from a plurality of consecutive sentences of the training text information and generating the unit of training from the extracted consecutive sentences, such that a sentence included in the unit of training coincides with a sentence included in another unit of training, and a feature quantity is further obtained for each unit of training from one or more types of information that include information acquired from a word or a clause in each sentence of the unit of training and information acquired by comparing the training text information and each sentence of the unit of training.

36. The information analysis method according to claim 32, wherein in a case where a plurality of sentences of the training text information are numbered consecutively, in the step (d), the plurality of units of training are generated by, for each unit of training, extracting a preset number of consecutively numbered sentences, such that the number of a beginning or end sentence to be extracted shifts by a set number for each unit of training, and a feature quantity is further obtained for each unit of training from one or more types of information that include information acquired from a word or a clause in each sentence of the unit of training and information acquired by comparing the training text information and each sentence of the unit of training.

37. The information analysis method according to claim 32, further comprising the steps of:
- (f) estimating, for each unit of training, a density indicating a degree to which the unit of training contains the target information; and
- (g) generating feature data from the density estimated in the step (f) and the training data, and further acquiring a determination model usable in the determination performed in the step (b), using the feature data,
- wherein in the step (b), it is determined whether or not each sentence is target information in accordance with the determination model acquired in the step (g).

38. The information analysis method according to claim 37, wherein in the step (f), for each unit of training, a density indicating a degree to which the unit of training contains the target information is estimated using the density estimation model acquired in the step (e).

39. The information analysis method according to claim 37, wherein in the step (g), for each sentence included in a plurality of units of training, at least one of a sum, an average and a dispersion of the densities of the units of training including the sentence is obtained, and the feature data is generated using the obtained value and one or more types of information that include information acquired from a word or a clause in each sentence of the units of training and information acquired by comparing the training text information and each sentence of the units of training.

40. The information analysis method according to claim 32, wherein in the step (c), the plurality of units of analysis are generated in accordance with the same condition as the setting condition in accordance with which the units of training are generated in the step (d).

41. A non-transitory, computer-readable recording medium that records a program for causing a computer to perform an analysis on text information to determine whether or not the text information corresponds to target information, the program including instructions to cause the computer to execute the steps of:

(a) estimating, in units of analysis each composed of a plurality of sentences of the text information, a density indicating a degree to which the unit of analysis contains the target information; and (b) obtaining an evaluation value indicating a degree to which each sentence included in each unit of analysis corresponds to the target information from the estimated density of the unit of analysis, and determining whether or not the sentence is the target information based on the evaluation value.

42. The computer-readable recording medium according to claim 41, wherein the computer is further caused to execute the step of:

(c) generating a plurality of the units of analysis from the text information, wherein in the step (b), the density is estimated for each unit of analysis generated in the step (c).

43. The computer-readable recording medium according to claim 42, wherein in the step (c), the plurality of units of analysis are generated, such that a sentence included in each unit of analysis coincides with a sentence included in another unit of analysis.

44. The computer-readable recording medium according to claim 42, wherein in the step (c), the plurality of units of analysis are generated by, for each unit of analysis, extracting a preset number of consecutive sentences from a plurality of consecutive sentences of the text information and generating the unit of analysis from the extracted consecutive sentences.

45. The computer-readable recording medium according to claim 42, wherein in the step (c), the plurality of units of analysis are generated by, for each unit of analysis, extracting a preset number of consecutive sentences from a plurality of consecutive sentences of the text information and generating the unit of analysis from the extracted consecutive sentences, such that a sentence included in each unit of analysis coincides with a sentence included in another unit of analysis.

46. The computer-readable recording medium according to claim 42, wherein in a case where a plurality of sentences of the text information are numbered consecutively, the plurality of units of analysis are generated in the step (c) by, for each unit of analysis, extracting a preset number of consecutively numbered sentences, such that the number of a beginning or end sentence to be extracted shifts by a set number for each unit of analysis.

47. The computer-readable recording medium according to claim 46, wherein in a case where the text information includes N consecutive sentences numbered from 1 to N, and the plurality of units of analysis each include W sentences, (N+W−1) units of analysis numbered from 1 to (N+W−1) are generated in the step (c), in which case a 1st unit of analysis is generated from W 1st sentences, 2nd to (W−1)th units of analysis are each generated from the 1st sentence, a sentence whose number is smaller than the number of the unit of analysis, and a sentence whose number is the same as the number of the unit of analysis, Wth to Nth units of analysis are each generated by extracting W sentences numbered consecutively, while shifting the number of a beginning sentence by one such that the number of the last sentence is the same as the number of the unit of analysis, (N+1)th to (N+W−2)th units of analysis are each generated from a sentence whose number is smaller than N and an Nth sentence, and an (N+W−1)th unit of analysis is generated from W Nth sentences.

48. The computer-readable recording medium according to claim 41, wherein in the step (a), in addition to the estimated density of each unit of analysis, one or more types of information are obtained as a feature quantity of the unit of analysis, the one or more types of information including information obtained from a word or a clause in each sentence of the unit of analysis and information acquired by comparing the text information and the sentence, and in the step (b), the determination is performed using the evaluation value and the one or more.

49. The computer-readable recording medium according to claim 41, wherein in the step (a), the density is estimated using a feature quantity of each unit of analysis, where the feature quantity is one or more types of information that include information obtained from a word or a clause in each sentence of the unit of analysis and information acquired by comparing the text information and the sentence.

50. The computer-readable recording medium according to claim 41, wherein in the step (b), for each sentence included in a plurality of units of analysis, at least one of a sum of densities of the units of analysis including the sentence, an average of the densities and a standard deviation of the densities is obtained, the evaluation value of the sentence is calculated using the obtained value, and if the evaluation value exceeds a predetermined threshold value, the sentence is determined as corresponding to the target information.

51. The computer-readable recording medium according to claim 41, wherein the computer is further caused to execute the steps of:

(d) generating training data from training text information including information indicating whether or not each sentence of the training text information is the target information and having generated therein a plurality of units of training each composed of a plurality of sentences of the training text information, by setting, for each unit of training, a target information density indicating a degree to which the unit of training contains the target information, with reference to information indicating whether or not each sentence of the unit of training is the target information, further obtaining, for each unit of training, a feature quantity from information acquired from a word or a clause in each sentence of the unit of training, and generating the target information density and the feature quantity of each unit of training as the training data; and (e) learning a density estimation model usable in the density estimation performed in the step (a), using the training data generated in the step (d), wherein in the step (a), for each unit of analysis, the density is estimated in accordance with the density estimation model acquired in the step (e).

52. The computer-readable recording medium according to claim 42, wherein the computer is further caused to execute the steps of:

(d) generating training data from training text information including information indicating whether or not each sentence of the training text information is the target information, by generating a plurality of units of training each composed of a plurality of sentences of the training text information, from the training text information in accordance with a setting condition, setting, for each unit of training, a target information density indicating an amount of the target information included in the unit of training, with reference to information indicating whether or not each sentence of the unit of training is the target information, further obtaining, for each unit of training, a feature quantity from information acquired from a word or a clause in each sentence of the unit of training, and generating the target information density and the feature quantity of each unit of training as the training data; and (e) learning a density estimation model usable in the density estimation performed in the step (a), using the training data generated in the step (d), wherein in the step (a), for each unit of analysis, the density is estimated in accordance with the density estimation model acquired in the step (e).

53. The computer-readable recording medium according to claim 52, wherein in the step (d), the plurality of units of training are generated, such that a sentence included in each unit of training coincides with a sentence included in another unit of training, and a feature quantity is further obtained for each unit of training from one or more types of information that include information acquired from a word or a clause in each sentence of the unit of training and information acquired by comparing the training text information and each sentence of the unit of training.

54. The computer-readable recording medium according to claim 52, wherein in the step (d), the plurality of units of training are generated by, for each unit of training, extracting a preset number of consecutive sentences from a plurality of consecutive sentences of the training text information and generating the unit of training from the extracted consecutive sentences, and a feature quantity is further obtained for each unit of training from one or more types of information that include information acquired from a word or a clause in each sentence of the unit of training and information acquired by comparing the training text information and each sentence of the unit of training.

55. The computer-readable recording medium according to claim 52, wherein in the step (d), the plurality of units of training are generated by, for each unit of training, extracting a preset number of consecutive sentences from a plurality of consecutive sentences of the training text information and generating the unit of training from the extracted consecutive sentences, such that a sentence included in the unit of training coincides with a sentence included in another unit of training, and a feature quantity is further obtained for each unit of training from one or more types of information that include information acquired from a word or a clause in each sentence of the unit of training and information acquired by comparing the training text information and each sentence of the unit of training.

56. The computer-readable recording medium according to claim 52, wherein in a case where a plurality of sentences of the training text information are numbered consecutively, in the step (d), the plurality of units of training are generated by, for each unit of training, extracting a preset number of consecutively numbered sentences, such that the number of a beginning or end sentence to be extracted shifts by a set number for each unit of training, and a feature quantity is further obtained for each unit of training from one or more types of information that include information acquired from a word or a clause in each sentence of the unit of training and information acquired by comparing the training text information and each sentence of the unit of training.

57. The computer-readable recording medium according to claim 52, wherein the computer is further caused to execute the steps of:

(f) estimating, for each unit of training, a density indicating a degree to which the unit of training contains the target information; and (g) generating feature data from the density estimated in the step (f) and the training data, and further acquiring a determination model usable in the determination performed in the step (b), using the feature data, wherein in the step (b), it is determined whether or not each sentence is target information in accordance with the determination model acquired in the step (g).

58. The computer-readable recording medium according to claim 57, wherein in the step (f), for each unit of training, a density indicating a degree to which the unit of training contains the target information is estimated using the density estimation model acquired in the step (e).

59. The computer-readable recording medium according to claim 57, wherein in the step (g), for each sentence included in a plurality of units of training, at least one of a sum, an average and a dispersion of the densities of the units of training including the sentence is obtained, and the feature data is generated using the obtained value and one or more types of information that include information acquired from a word or a clause in each sentence of the units of training and information acquired by comparing the training text information and each sentence of the units of training.

60. The computer-readable recording medium according to claim 52, wherein in the step (c), the plurality of units of analysis are generated in accordance with the same condition as the setting condition in accordance with which the units of training are generated in the step (d).

* * * * *